(12) United States Patent
Yang

(10) Patent No.: US 7,797,261 B2
(45) Date of Patent: Sep. 14, 2010

(54) CONSULTATIVE SYSTEM

(76) Inventor: George L. Yang, 4628 Kings Mill Way, Owings Mills, MD (US) 21117

( * ) Notice: Subject to any disclaimer, the term of this patent is extended or adjusted under 35 U.S.C. 154(b) by 1554 days.

(21) Appl. No.: 11/104,928

(22) Filed: Apr. 13, 2005

(65) Prior Publication Data
US 2007/0003914 A1    Jan. 4, 2007

(51) Int. Cl.
*G06F 17/00* (2006.01)
*G06N 5/00* (2006.01)
(52) U.S. Cl. .................................... 706/45
(58) Field of Classification Search ............... 706/45
See application file for complete search history.

(56) References Cited
U.S. PATENT DOCUMENTS
5,006,992 A * 4/1991 Skeirik ................ 706/58
2004/0117213 A1 * 6/2004 Pache et al. ............. 705/2

OTHER PUBLICATIONS
On the Design of In-vehicle Advice System Qiao Liu; Itoh, H.; Yoshimura, K.; Systems, Man and Cybernetics, 2006. SMC '06. IEEE International Conference on Volume: 3 Digital Object Identifier: 10.1109/ICSMC.2006.385241 Publication Year: 2006 , pp. 2511-2516.*

* cited by examiner

*Primary Examiner*—Michael Holmes

(57) ABSTRACT

A consulting system helps a user on collecting information, building object model, and creating virtual environment, produces animated images, captures feedback from the user, analyzes user's response, and provides advices in various formats. First, the system provides interfaces for guiding the user to collect, manipulate, organize, search, and retrieve advices and their related examples. Next, the system provides interfaces for the user to build object models, which consist of the general object model for describing regular objects and human object model for describing human characteristics and behaviors. Further, the system provides interfaces for the user to build virtual environment from object models and creates animated images according to the events described in the related examples, properties associated with objects, and event templates. Further, the system captures user's feedback, which can be verbal requirement, facial expression, and keyboard input. Then the system analyzes user's response, compares to predetermined goals or expert's requirement, and provides user advices in various desired formats.

20 Claims, 22 Drawing Sheets

CONSULTATIVE SYSTEM

TECHNICAL FIELD OF THE INVENTION

The present invention relates to applying various artificial intelligence technologies, particularly the ones of collecting information, organizing information, modeling, analyzing human object, recognizing and synthesizing voice and image, and imitating human deducing process, to build a consultative system.

BACKGROUND OF THE INVENTION

People need consulting. Nowadays, many self-help books, audio tapes, audio CDs, video tapes, video CDs, as well as software are available for consulting people on problems in many different fields. Even though these materials help people to some extent, they usually do not consult each individual specifically, do not help people to analyze their problems, do not provide interactive service, do not help people to distinguish a good advice from a bad advice, and do not specify their applicable situations explicitly. Without really understanding an advice and knowing how to apply an advice, an advice, even a good advice, could bring people disasters as seen frequently in real life.

First, these consulting materials normally do not provide opportunity for people to practice what they have learnt. These materials present advices, principles, and examples but they do not provide chance for people to practice in an environment similar to each one's particular situation. Some authors of these materials may appeal people to use their methods in people's daily lives and may even list a proposed action plan with detail instructions. However, the authors cannot control people's behavior after people have closed the book or stopped playing CD. Having no chance to practice, people tend to forget quickly the knowledge they have heard or read and have difficulty to apply well the knowledge in daily life. Due to this reason, people usually purchase many different self-help materials on a same topic from different authors or sometimes even from a same author.

Second, these self-help materials cannot help people to analyze their problems. Usually these materials only provide people some advices, principles, and examples but do not take feedback or just take very little restrictive feedback from people with no concerning about the particular background and the particular situation of each person. Without capturing people's feedback, without concerning people's particular situations, these self-help materials cannot provide people specific helps and address people's specific problems.

Third, these materials usually are not interactive. Nowadays, though people encounter a lot of information each day, people have less time to study in-depth and have less momentum to make actions. Many people need push to take action. If a material is non-interactive, many people could feel bored. People intend to forget quickly the information on the material and therefore, it is more difficult for people to take action.

Forth, different self-help materials may offer different advices on a same issue and sometimes these advices may contradict each other. The differences on these advices come from many reasons. The first reason is that different authors may have different assumptions, which these authors have not clearly stated in their books or tapes, or they have not emphasized enough. The second reason is that even though different authors have same assumptions on a same scenario, they may adopt different approaches on handling the scenario.

Fifth, a few authors of the self-help materials have not verified each advice on their materials by themselves. They may copy some advices from other materials and cite many quotations from other people to make their materials look more complete. These authors may not have enough experience on what they said, do not understand the real meanings of an excerpt, and do not know the applicable scope of an excerpt and the limitations of an advice. It is the responsibility of people, who are using these self-help materials, to distinguish essences from appearances and tell a good advice from a bad one.

This invention will overcome above shortcomings by providing people interactive personal consulting system, monitoring people's progress, helping people to collect advices, capturing people's feedback, aiding people to model and analyze object, giving people advice, assisting people to build environment and customize the personal consultative system, reporting people progress, and offering people private training.

OBJECTIVE OF THE INVENTION

The primary objective of the invention is for a user to practice in a desired virtual environment and obtain necessary helps by building virtual objects from object models, building a virtual environment with these virtual objects, generating necessary helps, and creating a consulting session according to the features of an advice, a consulting session template, background, and feedback.

Another objective of the invention is to provide a system for a user to collect, sort, search, and organize advices, associate related advices together, add examples, make comments, select experts, adjust expert's credibility, edit advices, split advices, merge advices, and modify rules designed for performing various operations.

Another objective of the invention is to provide a system for a user to model people by separating people into various categories, collecting people's behaviors, tracking people's emotional status, and building links among stimulus, people's accumulated status, and possible reactions.

Another objective of the invention is to provide a system for recognizing voices, facial expressions, and other body languages by extracting features, comparing extracted ones to the ones in database, and making likelihood decisions.

Another objective of the invention is to provide a system for identifying the real meaning of sentences, speaking manners, gestures, and other body languages by making joint decisions on extracted information according to the general behavior guide for people under a particular category and the special behavior history of a particular person.

Another objective of the invention is to provide a system for helping a user to analyze objects and the relations among these objects by displaying properties of objects, executing utilities for identifying relations, and providing interfaces for the user to define relations.

Another objective of the invention is for a user to replant experience and erase negative experience by providing interfaces for the user to create virtual environment, design an experience with desired effects, repeat the experience, and generate positive feedback.

Another objective of the invention is to provide a system for a user to analyze what happened, sharpen observation, enhance memory, accelerate response speed, control response, and make action effectively by letting the user rebuild scenario, pointing out ignored details, reminding the user about related principles, and suggesting for rational responses.

Another objective of the invention is to provide a system for a user to monitor behavior, evaluate performance, and collect feedback by recording user's response, rebuilding scenario, playing rebuilt events, asking expert's advices, and comparing performances with previous results.

Another objective of the invention is for a user to model and analyze a person by providing interfaces for the user to categorize people according to various partitions, to describe the person's general behavior according to the coordinates of the person in every partition of people, external conditions, and accumulated status, and to specify the person's special behavior criterions.

Another objective of the invention is to provide a system for a user to make progress by displaying the desired behavior, the simulated behavior, and the real behavior, by noticing the user about their differences, and by providing the user the suggestions for improvement.

Another objective of the invention is to provide a system for a user to analyze an event from different aspects by displaying the event from the different people's eyes, and showing the developing process of mental statuses of these people.

Another objective of the invention is to help a user to control behavior by monitoring language, words, mode, body language, and heart beating, and by providing proper advices.

Another objective of the invention is to provide personal training by providing interfaces to create many different training scenarios, modifying these scenarios to create variations, capturing up feedbacks, and dispatching advices.

SUMMARY OF THE INVENTION

The system provides interfaces and utilities for completing commonly encountered tasks such as collecting, organizing, searching, editing, and displaying advice, for building various object models, for categorizing human types, for modeling human behaviors, for recognizing voices, facial expressions and other body languages, and for generating voices, body languages, and actions. The system also presents interfaces and utilities for building virtual environments, for creating objects, for capturing people's feedback, for analyzing people's responses, for generating an animating consultative session, and for providing opportunities for a user to exercise, gain experience, and sharpen observation capability. Further, the system supplies interfaces and utilities for creating a desired personality, for comparing desired personality with captured personality, for evaluating progress, for changing viewing direction, zooming in, and zooming out, for changing viewpoints, for detecting other people's possible feeling, and for providing the user special helps.

BRIEF DESCRIPTION OF THE DRAWINGS

The drawing figures depict preferred embodiments of the present invention by way of example, not by way of limitations.

DETAILED DESCRIPTION OF THE PREFERRED EMBODIMENTS

The system provides consultative service by providing various interfaces to display related information, capture feedback from a user, and execute utilities accompanied with these interfaces. These utilities are either pre-built ones in the system or on-the-spot ones customized for particular purposes. First, the system provides interfaces for a user to collect, organize, manipulate, display, and make comments on advices and their related examples. Second, the system provides interfaces for a user to build a virtual environment with various virtual objects. Third, the system provides various advices to a user at proper time. Besides many useful predefined utilities saved in its database for various tasks, the system also provides interfaces for a user to build and modify customized rules to create customized utilities. One can consider a rule as a guideline to perform a specific task. When a rule is in form of regular expression, subroutine, or macro, the system can execute the rule directly. When a rule is in form of pattern, example, or description, the system will call related utilities to interpret the rule, generate a utility, and then execute the utility. Though it would be perfect if a user could define a utility to handle all the possible cases, it is much easier for the user to refine a utility gradually especially when the user has no enough information about all the possible cases at the very beginning. With the help of proper interfaces provided by the system, a user can display organize, and modify these rules according to category, layer, priority, and processing flow. A user can refine, generalize, specialize, and split a rule, combine two or more rules into one rule, and assign priorities to a set of rules statically or dynamically and temporally or permanently. When there are two or more rules for a same operation, the higher priority rules will override the lower priority rules and the specific rules will override the general rules.

Figure 1:
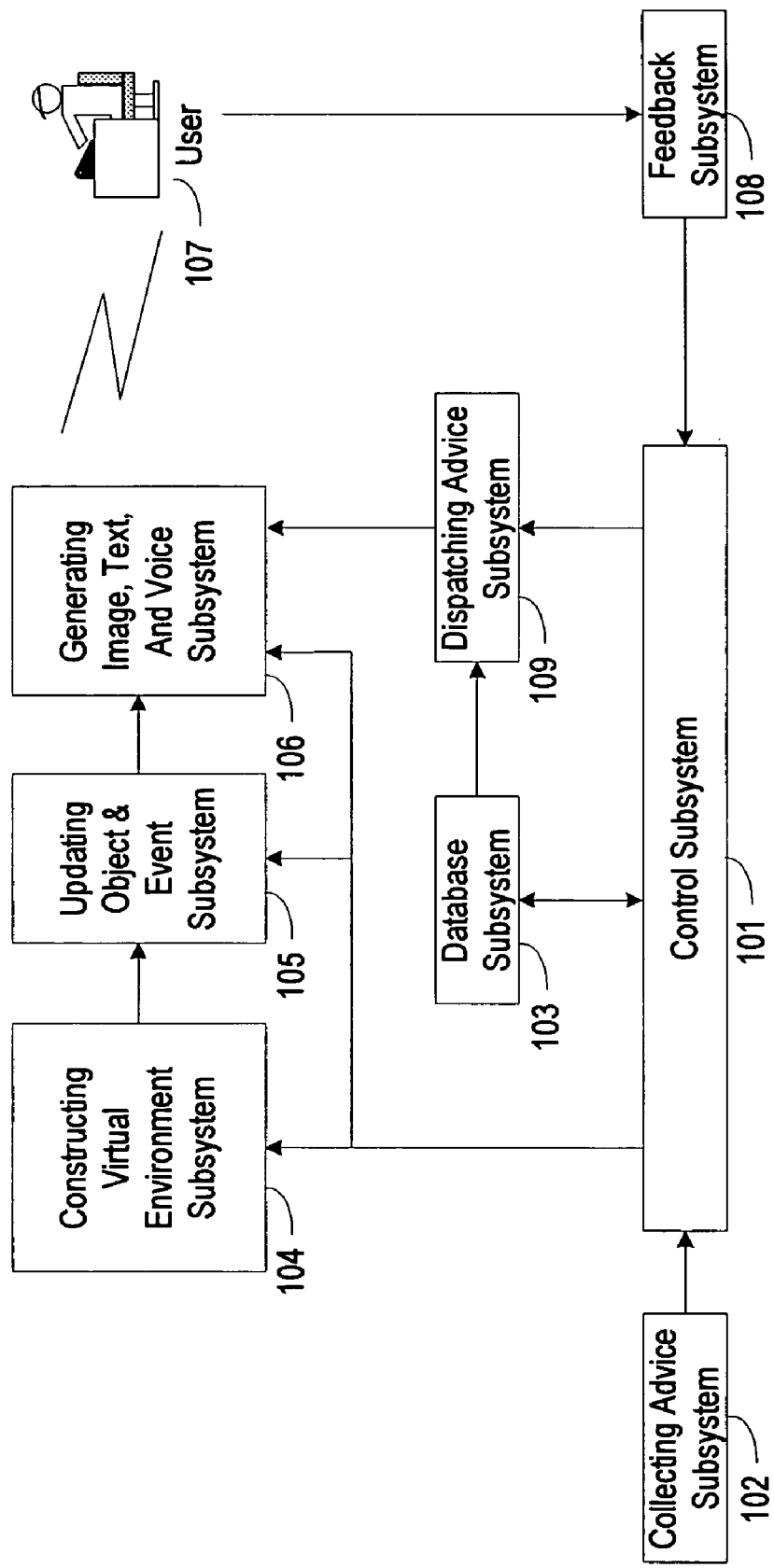
FIG. 1 illustrates the overall diagram of the invention.

FIG. 1 shows the overall diagram for the system of the invention. Consisting of several subsystems, the system provides interfaces for a user to collect advices, build virtual environments, update objects, generate images, texts, and voices, capture user's feedback, analyze user's responses, and provide advices in proper formats.

The control subsystem 101 controls all other subsystems. According to an event schedule for a consultative session, the control subsystem 101 loads related commands and data into computer memory, executes these commands in proper order, passes variables and parameters among subsystems, and makes subsystems work concordantly. According to the information about a user, the control subsystem 101 can incorporate the situation specific to the user into an event schedule. The event schedule can have several predefined cases at each major decisive point to cover most the cases and to reduce speed requirement. The control subsystem can also provide interfaces for a user to modify an event schedule. The control subsystem 101 can provide a simple interactive consultative service by making each decision to one of the predefined cases, generating corresponding images and voice, and offering advices according to user's feedback. The control system 101 can further provide a more complex control by making decision not limited to predefined cases, modifying events, inserting assistant events, adjusting an event schedule, and generating new utilities. The most commonly encountered assistant actions are to make actions smooth by interpolating the actions.

The collect advice subsystem 102 provides interfaces for a user to collect, format, modify, organize, save, present, and link advices, examples, and images and to make comments. First, the subsystem 102 helps a user to collect the advices from various aspects. Besides the forms and associated instructions for collecting commonly encountered types of advices, the subsystem 102 also provides interfaces for a user to build customized forms and instructions for collecting new types of advices and for collecting existing types of advices from different aspects. Depending on the type of an advice, the subsystem 102 provides corresponding forms and instructions for collecting that advice. The subsystem 102 further supplies various utilities for formatting advices, modifying advices, sorting collected advices into various categories, arranging advices in various orders, and saving advices in proper forms. Moreover, the subsystem 102 provides utilities for specifying how to display an advice in text, in figure, or in cartoon, for defining how to present an advice in voice, and for converting a verbal advice to a written advice and vice versa. In addition, the subsystem 102 provides utilities for associating advices, examples and images with related advices, examples, and images, for specifying the ways of presenting advices as well as their associated images and examples, for building links among different advices, and for making comments.

The database subsystem 103 saves, searches, organizes, and retrieves advices, related examples and images, object models, and rules. The system either has embedded a database designed specifically for the system or has established a link to a database built from a third party. In either case, the subsystem 103 provides various database technologies directly or indirectly for a user to design tables, forms, queries, reports, pages, macros, and modules, to fill tables, to launch forms, to start queries, to generate reports, and to build customized subroutines and functions used in the database.

The constructing virtual environment subsystem 104 provides interfaces for a user to build a virtual environment. First, the subsystem 104 provides various common environment templates such as typical office environments, typical home environments, and vocation resort environments. By providing proper interfaces and associated utilities, the subsystem 104 helps a user to build a virtual environment from one of these templates and to modify the environment. The subsystem 104 also provides interfaces for a user to build a virtual environment from scratch or to from modifying an existing virtual environment. Further, the subsystem 104 provides interfaces for a user to add virtual objects into a virtual environment. An easy way to build a virtual object is to create one from a corresponding object template. Here an object template is an abstraction of a corresponding physical object with important properties under consideration kept and other properties ignored. The objects templates for tables, computers, keyboards, mousse, phones, printers, chairs, whiteboard, marker, and eraser are some examples of frequently seen object templates to build a virtual office. By providing various object templates, the subsystem 104 helps a user to build a virtual object quickly from a corresponding object template by inheriting properties from the object template, editing properties, assigning some properties to default values, and setting some properties to desired values. For example, though a table template has default settings, a user can set the shape, color, and size of a table object. The subsystem 104 provides utilities to handle the interactions among objects in a virtual environment according to their relations and provides interfaces for a user to override existing utilities, modify existing utilities, and build special interaction relationships. These utilities can be in many different forms such as macros, subroutines, regular expressions, or even examples. In order to handle examples, the subsystem 104 provides necessary utilities to extract features from given examples, generates proper subroutines, functions, or regular expressions, creates utilities, and run these utilities.

Since the human objects are very important items in a virtual environment, the subsystem 104 provides interfaces for a user to add, modify, specify, retrieve, and save human objects conveniently. Through these interfaces, a user can specify figure, face, categories, and general behaviors for a human object. The categories, the general behaviors, and the specific instructions associated with an advice or example and the actions of other human objects determine how a human object will behave. If an idea has several different expressions, when an advice or its example does not provide specific instructions on how to represent the idea, the system can pick up an expression randomly, in certain order, or by following some rules.

The subsystem 104 also provides interfaces for a user to make an event arrangement by building an event schedule from an event schedule template, from scratch, or form modifying an existing event schedule. Being an exemplary event arrangement for a particular type of consultative session, an event schedule template specifies the order of major events and can contain event templates. These event templates associate various rules to specify how to create events from texts or drawings. Through proper interfaces provided by the subsystem 104, a user can further modify an event schedule template, an event template, an event schedule, and an event in an event schedule. The description of an event in an event schedule contains the information to generate image and voice directly or indirectly.

The updating object and event subsystem 105 is for updating various objects and events. First, the subsystem provides interfaces for a user to specify more details for objects, establish relations among different objects, create utilities for these relations, override utilities, and link utilities to certain stimuli. Second, the subsystem can fill objects with more details by extracting information from advice, database, user response, and Internet. Third, the subsystem provides interfaces for the user to organize rules into various categories, create rules, and specify when to apply rules, how to extract information, and how to modify objects. For example, the subsystem can provide interfaces for a user to specify the rule for identifying nationality, body figure, speaking speed, and vocabulary associated with a human object. Fourth, the subsystem updates events by capturing responses, adjusting an event schedule, modifying events, and inserting assistant events, changing parameters and utilities.

The generate image, text, and voice subsystem 106 is for generating image, producing text, and creating voice from advices and their examples, from the recorded video, or from both. By watching the images, reading the texts, and hearing the voice, a user can understand an advice better, make use of the advice better, and remember the advice better with multiple organs participation than with any single organ only. A user can also watch one's own performance by letting the system capturing user's feedback, processing captured images, inserting processed images into original images generated from advices, and regenerating user's voice. The system can further help a user to analyze response, provide advices in proper formats, and make the user aware various behaviors that the user ignores.

By watching image, hearing voice, and reading text, the user 107 will respond correspondingly. The system will capture user's feedback and evaluate user's progress.

The feedback subsystem 108 captures user's feedback. The feedback includes keyboard input, mouse movement and click, verbal language, facial expression, and other body language as well as information from various sensors. According to various settings and the feedback extraction rules, the subsystem extracts features from facial expressions, conversations, and vocabulary, removes unnecessary details from the captured information, makes important features outstanding, and conducts various judgments.

According to the analysis, the dispatching advice subsystem 109 provides proper advices to a user in various ways. For example, when a user searches for advices in a particular category, the subsystem will list all the advices under that category and provide necessary links for the user to check each advice and its associated examples and pictures. Besides after-session advices, the subsystem can provide advices on spot when a user needs. For example, in a particular training section, when a user has difficulty to handle a particular situation and asks for help, the subsystem will suggest an approach to handle the situation properly according to that circumstance and expert's opinions saved in database. Further, the subsystem can provide different helps for different users or different helps for a same user under different learning stages. Since different users have different sharpness and shortcoming, the helps for different users are different to achieve best effect. A same user can also have different requirements on help during different stages. For example, when a user starts to practice the exercise for an advice, the user may want to aware other people's gestures as many as possible. However, at the review stage, the user may want the system to mark only the gestures that the user ignores. Sometimes, a user may want the system to give detail explanation by listing related rules and expert's opinions as well as the reasoning process.

Figure 2:
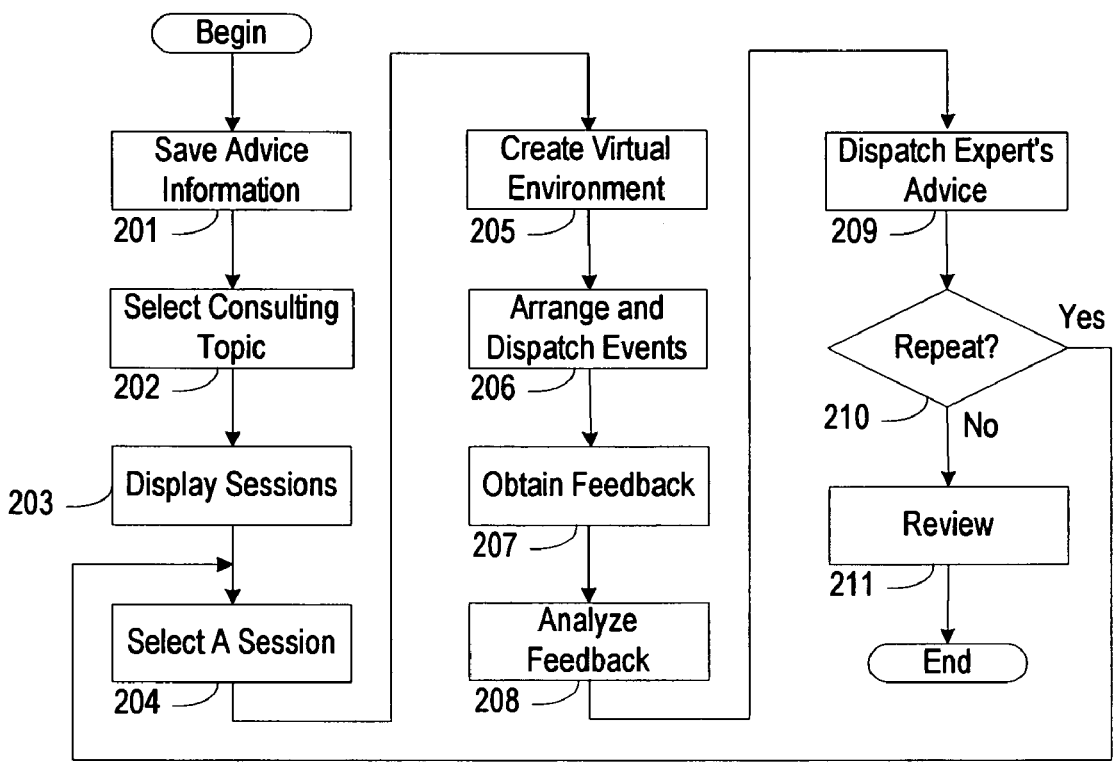
FIG. 2 illustrates a general flowchart of a consulting session.

FIG. 2 shows the general flowchart of a consultative session. The system provides interfaces and utilities for a user to collect and save advices, to search for topic, to create virtual environment, to generate events, to capture user's feedback, to analyze user's feedback, and to provide advices.

At step 201, the system provides various interfaces for a user to collect, sort, and save advice related information. These interfaces can be in fixed forms for commonly encountered topics or in flexible forms that a user can change within certain degrees. First, the system provides forms, tables, and dialogues with corresponding instructions to guide a user to collect advices from a related text, audio, and video. The system can also provide interfaces for a user to build customized forms, table, and dialogues and their associated instructions to meet a specific need. Second, depending on settings, the system can collect advices automatically, semi-automatically, or manually. According to the rules of collecting advices, corresponding utilities, the types of advices, and available utilities, the system can collect different aspects of an advice automatically. The system can also provide interfaces and instructions for a user to collect advices manually by reminding a user to gather information from different aspects according to the types of advices, related settings, and rules for collecting information. The system can further provide interfaces for a user to collect information semi-automatically. For example, the system can extract related information automatically, display information in proper formats, and then let a user make final decision or modification. Third, the system can automatically search for related information from Internet according to settings and some predefined search rules. Fourth, the system can categorize advices according to predefined rules and related settings and provide a user to sort advices manually. Even though an advice may be originally in one of the forms such as text, image, audio, and video, the system can provide interfaces for a user to save the advice in other forms with proper indications on principles, assumptions, suggested responses, associated examples, and handling methods for the advice.

At step 202, the system provides interfaces for a user to select consultative topics and specify the ways to how to conduct a consultative session. Through proper interfaces, a user can specify categories, subcategories, keywords, experts, the ways of consulting, or other relations to narrow the possible topics. Then, the system displays all the available consultative topics, their related examples, and other related consultative topics so that a user can select a consultative topic. In addition, the system provides interfaces for a user to specify the topic specific settings. For example, a user can specify how to present a particular consultative topic, when to present advices, and how to dispatch advices especially when that particular consultative topic has several ways of presentation.

At step 203, the system displays the available sessions for a consultative topic or subtopic. Under each consultative topic or subtopic, the consultative sessions are in form of examples or interactive animations. The different examples under a same topic are for different users or a same user under different stages.

At step 204, the system selects a session automatically according to user's preference, history, and the related rules for selecting an example. The system can also provide interfaces for a user to specify which session that the user wants to select.

At step 205, the system builds a virtual environment by loading an existing virtual environment into the system. The system can also provide interfaces for a user to modify an existing environment or to create one from scratch. If a selected example has a virtual environment and the associated virtual objects, then the system can load the virtual environment and the virtual objects into memory. If the selected example has no any associated virtual environment, then the system provides interfaces for a user to build a virtual environment from scratch or from modifying an existing virtual environment.

At step 206, the system makes an event schedule for a selected session, creates events, dispatches the events, and generates text, voice, and image. The system can make an event schedule according to chronological order, other relations, or rules for arranging events. If an example has specified events in detail, the system can simply create and dispatch these events. Otherwise, the system will build events according to event templates, rules for building events, and default behavior templates. The system can also provide interfaces for a user to build events by specifying virtual objects, modifying default behaviors of virtual objects, defining human objects, their histories, mental statuses, and the reaction mechanism, creating response rules, specifying temporary behaviors and habitual behaviors, and arranging events chronologically or spatially.

At step 207, the system captures a user feedback. Receiving image, text, and voice generated by the system, a user can respond in various ways. The system will capture user's direct and indirect responses. A user can respond directly. For example, a user can talk, produce gesture, and create facial expression. A user can also generate response indirectly. A user can input data through keyboard, click mouse, and use joystick. The system will capture user's verbal and behavioral action.

At step 208, the system analyzes user's response. The analysis is fundamental to decide which step to go next, what kind of advice the system should give to a user, and how to evaluate user's progress. First, the system monitors important words and expected words on speech and input text. The system can have a set of predefined important words. The system can also provide interfaces for a user to modify the list of important words and the list of expected words. Here the expected words are usually words that should appear in an expected answer. Second, the system can provide interfaces for a user to specify rules for identifying these important words and the expected words, to specify rules for analyzing user's response, and to generalize, specialize, split, and merge rules. The system will make a joint detection according to user's voice, text input, facial expression, and body language.

At step 209, the system provides advices according to user's preference, circumstance, user's response, expert's opinion deduced from related principles, and the rules for controlling how to display advices. Depending on setting, the system can mark important words, give the user some hints, provide full explanation, and suggest alternatives. The system can offer an advice on the spot or provide suggestions at end of a consultative session.

At step 210, the system checks that if a user wants to repeat the exercise. If yes, go to step 204 and otherwise, go to step 211. People can learn some skills at once and people may need to practice several times to master other skills. Depending on setting, the system can simply dispatch the events again and let a user practice more, replay recorded events with the user image and voice inserted so that the user can observe one's own performance, or generate certain variations. The system can create variations by replacing a word with a different word selected from a set of synonymous words, changing topic to slight different one, changing environment to slight different one, modifying some virtual objects, etc.

At step 211, the system helps a user to review what happened. The system can replay a session by inserting user's image and voice into a scene and provide different viewing directions for a user to watch how the user and other people interact. The system can also give comment, provide suggestion, guide a user for improvement, and offer various helps according to the properties of advices, the behaviors of virtual human objects, the preference of the user, the responses from the user, and the rules for reviewing.

Figure 3:
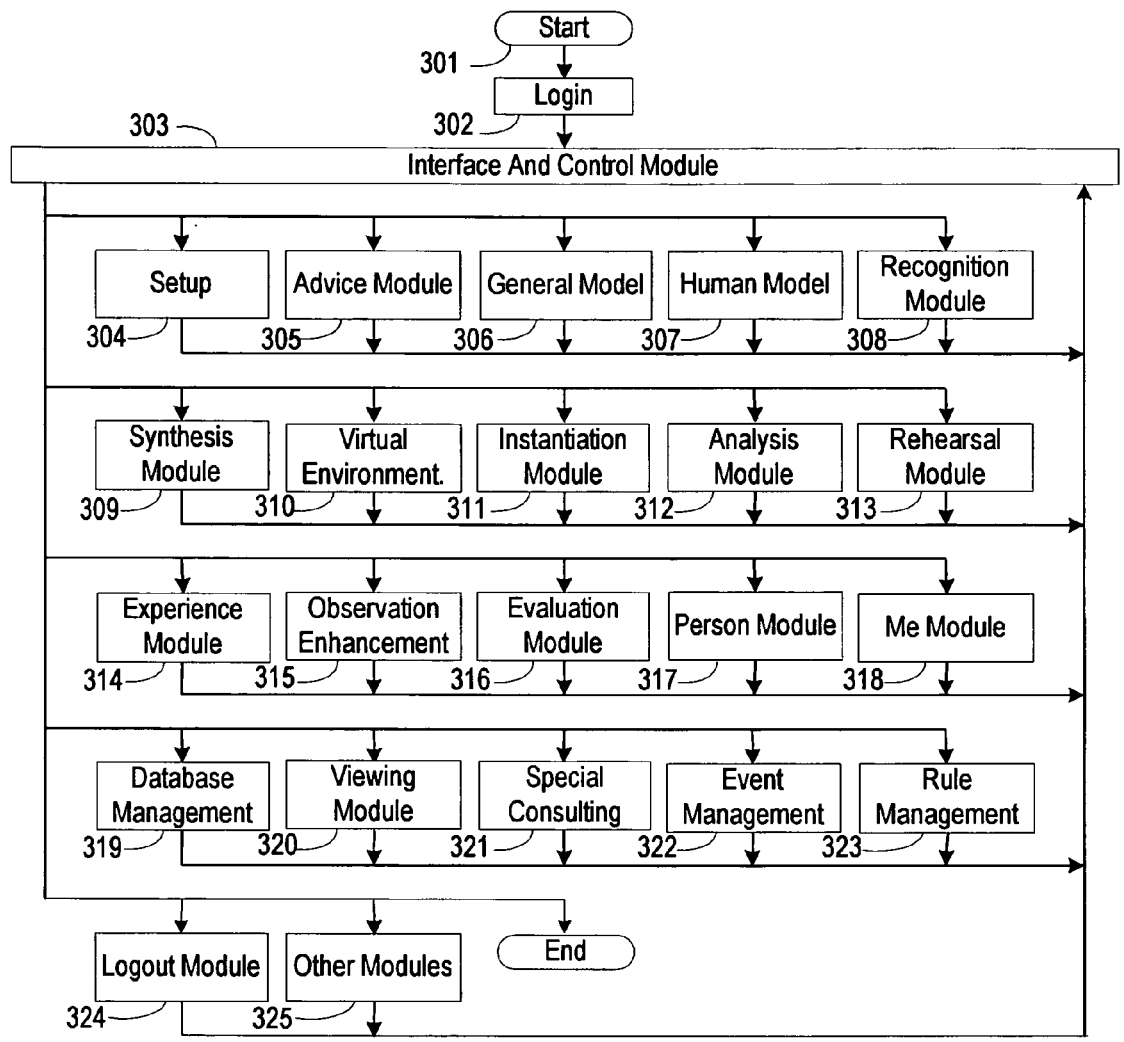
FIG. 3 illustrates the major modules of the system.

FIG. 3 shows the major modules in the system. The system and its modules can have window interfaces, command line interfaces, or their combination. Each module consists of one or more closely related utilities in form of subroutines, procedures, functions, macros, scripts, and other formats. Depending on a particular situation, a module can form proper parameters and arguments and call one or more related utilities. Besides many utilities predefined, a module can create new utilities on spot according to related rules associated with the module and the properties of various objects. The exemplary system is a window-based program. Through a window-based interface, a user can launch any module that is available at a particular moment. To perform a complex task, a module can call the utilities in other modules besides its own utilities. According to preferences, setups, and related rules, the system provides corresponding interfaces, utilities, and flow controls to accomplish various tasks. Each subsystem in FIG. 1 can contain some of these modules to achieve specific purpose. For example, the subsystem 101 can comprise module 303, module 304, module 322, and module 323; the subsystem 102 can comprise module 305; the subsystem 103 can comprise module 319; the subsystem 104 can comprise module 310, module 311; the subsystem 105 can comprise module 320; the subsystem 106 can comprise module 309; the subsystem 108 can comprise module 312; and the subsystem 109 can comprise module 305 and module 320.

Starting at step 301, the system provides an interface for a user to login at step 302. Through the login process, the system can identify the user and load the information about the user into the memory from a database and Internet. The information about a user can include preferences, settings, background, and status. Then the system displays the interface and control module 303.

The interface and control module 303 has several purposes. First, it provides interfaces for a user to launch another module, call some utilities in that module, and pass the related parameters to a called module. Having completed a corresponding task, that module will return the control to module 303. Among all the controls performed by module 303, a very important control is to let a user specify which rule to govern a task, if a user wants to debug a task, under what conditions a user wants to debug the task, etc. For simplicity, one can call a task under the control of a corresponding rule as a task with rule. A task can have rules associated with it directly or indirectly. Whenever the system is going to execute a task with rule, the system will call a related rule to accomplish the task.

Second, the module 303 provides interfaces among different modules. A module can call another module. Module 303 passes the parameters and arguments from one module to another module. A module or a utility in a module can have arguments and parameters predefined. There can be utilities specific for determining the arguments and parameters associating with a module or a utility within a module. This module exchanges information with calling module, finds out parameters, and creates arguments directly or indirectly. If the needed parameters or arguments are not available directly, then this module will call a related utility to find them or create utilities according to related rules and function templates and then call the utilities just created to find these values.

Third, the module 303 can also have control functions by loading and executing scripts and subroutines with or without compiling. According to the tasks that the system is going to execute, virtual object's behaviors, and user's responses, module 303 determines when and how to call modules and their utilities. Usually module 303 can dispatch events according to chronological order or special order. However, a user can specify rules to override the default orders. There can be some default utilities for handling timeout and some exceptions.

Further, a user can debug a task if the user has specified to do so or if any error occurs. Depending on user's preferences, settings, and templates, module 303 generates an overall flowchart to control the general execution of a task. At a particular moment, if some modules are not available, then the system will disable these modules. The system can also disable some utilities supposed not available at a particular moment. Usually the system can link a module to a window interface item such as a menu, a dialog, a tool bar, a shortcut, and an icon.

The setup module 304 provides interfaces for a user to specify preferences, default settings, default properties, and default utilities. Different users have different requirements on a consultative topic and even a same user can have different requirements at different stages on a same consultative topic. The module also provides interfaces for a user to save current setting, load a previous setting, and modify a setting. For dealing with complex situations, the setting can have several layers with the layers more specific to override the layers less specific. This module can further help a user to set up preferences dynamically. For example, the module can provide interfaces for a user to set up the preferences at different stages. At a particular stage, the system will load corresponding settings into the memory.

The advice module 305 provides interfaces to collect, save, search, display, compare, modify, and dispatch advices. Besides an advice, usually people want to include the expert's name and profession, categories, assumptions, application methods, exceptions, advantages, disadvantage, examples, user comments, associated advices, and related rules of the advice. The module can have many different interfaces with each one for handling a corresponding subject or topic. The module can also provide interfaces for a user to create forms and utilities for handling advices specially. Further, the module provides interfaces for a user to create variations on the examples associated with a consultative topic besides the various examples provided by authors of a book or a cassette for the consultative topic. The module can provide two approaches for a user to create variations. The first one is to create variations according to general equivalence of words and saying. The system can have a thesaurus for synonyms and oppositions as well as the different sentence patterns for expressing a sentence. The second one is to create variations for particular events or sayings. The way of creating variations for a particular event or saying may not apply to a general situation but it can work fine for a particular event, object, or saying. A user can create variations directly or indirectly. A user can specify rules for creating variations and then let the module create variations on spot according to corresponding rules. According to setting, the module can provide a user advice on-the-spot or after a training section according to selected topic, practice scenario, sentences, behaviors for each virtual human object, user's feedback, expected user's response, advice, and the rules of dispatching advice. Also depending on setting, the system can dispatch an advice as a hint in form of text, image, symbol, and sound or with more detail. The user can further require the system to list reasoning process and to provide detail explanation.

The advice module 305 provides advices in many different ways. First, the module can supply a user with the general advices from each of the selected virtual experts or advices specific to a particular situation. Second, the module can list the advices on a same issue from various experts. Since different experts may give different or contrast advices, the module can display related advices or selected aspects of these advices one by one or simultaneously with their differences highlighted. Through interfaces provided by the module, a user can ask for more detail information about an advice such as its assumption, its example, its principle, its exception, and its credibility. Third, the module lets a user put comments on the advices of various experts. What said by an expert may be useful in certain circumstance, may be no much use in some other situation, or may be totally nonsense in the rest. In addition, an advice may be good to some people and may be useless to other people. By listing the advices from different experts, the module helps a user to compare advices and notice the limitations of advices.

The general model module 306 provides various interfaces for a user to build regular object model. Through the interfaces, a user can build new objects from object templates by stretching objects, assigning properties, overriding default properties, and linking to specific utilities. The most common encountered general objects in regular office include office desk, window, bookshelf, computer, telephone set, notebooks, books, and pens. These object templates can be 2D or 3D based templates. The system can generate a 2D object image from a 2D object directly. The system can also generate a 2D object image from a 3D object indirectly by projection. For animal objects, there can models for simulating the animals' status and predicting possible behaviors for various stimuli.

The human model module 307 produces human objects. The module provides interfaces and tools to illustrate human outlooks, define verbal and bodily features, list frequently used words and the way of saying things, describe various human characters, depict mind activity, specify accumulated affection, emulate inner mind behavior, predict possible response, and mind migration process. For example, the module provides interfaces to specify the nationality of a human object, modify face shape, modify the body figure, change clothe style as well as the color and pattern on the clothe, specify the way of saying some specific sentence patterns, and the vocabulary used by particular human objects. The module can also separate people into many different categories with each category having several different types according to psychology and other science subjects. The module can further provide interfaces to generate mind models for various people according to their specific categories, statuses, and some temporary factors, and to modify a person within a reasonable range. In addition, the module can improve modeling a person according to the current model of the person, what the person has said, and the expression the person generated.

The recognize module 308 provides necessary utilities to recognize voice and image as well as its potential meaning. Usually the module can identify the meaning of a word, a phrase, or a sentence directly. However, sometimes people may say indirectly or reversely. The module identifies the real meaning jointly according to what said by a person, voice, tone, facial and body language, and previous results. The module can also identify the mode of a person according to fuzzy math and psychological features. According to how and what a person says, the word, the facial expression and other body language used by the person, and the history of the person, the module derives a possible mind status. The module can use finite state diagrams or equations to simulate mind statuses and their migrations and predict the possible change according to related rules. Under different states, a person can have different responses for a same stimulus, which can include meanings and the way of expressing the meanings.

Module 308 can improve modeling person and tracking mind activity by using all available information. The module includes utilities to process the information from other sources such as heart beat sensor, electrocardiograph, intense sensor, and sweat sensor. These sensors further provide objective measurement on how a user to handle tough situation and provide proper positive affirmative for a user to improve performance.

Module 308 can also recognize voice. First, the module extracts voice features from a person so that later the system can simulate that voice. Second, the module recognizes the voice, generates corresponding text, and attaches the text with proper voice notation. According to the voice feature of a person, the sentence types, the emphasized portion, and the emotion status, the system can simulate the voice of that person.

Module 308 can further recognize image. First, the module extracts the important facial expression and body gesture from the images captured by camera or camcorder. Second, the module links certain gesture to related voice, text, and corresponding mind model so that the system can regenerate gesture to build virtual behaviors. Third, the module can provide interfaces for a user to categorize facial expressions and other body gestures into many types.

The synthesis module 309 generates various voices and animating images. First, the module generates images and voices from examples, general and special requirements, and user's response. Second, the module provides interfaces and utilities for a user to extract information from captured images, refine the information, create images or image regeneration utilities, and link text to related images or utilities. This feature enables a user to teach the system. For example, a user can link a certain response to an action according to the performance of an actor. Third, the module provides interfaces for a user to specify how to generate images and voices and to modify images and voices. The image can be continuous or cartoon, generated by the system or created from the captured image and the voice can be one generated from examples, general requirements, templates, or specified by a user.

The virtual environment module 310 provides various tools and interfaces to set up the virtual environment. If events happen in an office, a user may want to build a virtual office with desk, bookshelf, and telephone. There can be one or more background images, which will change when the place of event changes. For example, when two persons talk while they are walking from hallway into an office, the system will change the background image correspondingly. The system may have some rules for identifying the background change and some utilities for changing background images correspondingly. A virtual environment may have all its objects or portion of its objects initially on stage. The system can display some objects initially and show objects hidden initially when the time is ready.

The object instantiating module 311 provides interfaces to make objects from object models with some of the default properties and functions inherited and some of them overridden. The module also provides interfaces for a user to modify an object and to specify different properties and response actions.

The analysis module 312 includes pre-analysis and post-analysis. First, the module helps a user to analyze important issues and remind the user of the general approach to a particular matter according to the selected experts. Second, the module lets a user review what just happened in a virtual simulation session. Various tools can be available for a user to examine one's own facial and body expression, the strategy to present an issue, and the manner to deliver the issue. Third, the module can generate comments on how a user precedes by following related rules and expert's principles. When a user requires detail, the module can provide the supporting material by text, voice, or a portion of movie and emphasize key issues by arrow, flush, and other means. Forth, the module can help a user to do a post-analysis on what real happens about an issue. The module provides interfaces for a user to rebuild the environment with related virtual materials and virtual persons from captured images and sounds, asks various questions to dig information from a user, recreates events, and modifies events. Different topic or consultative session can have different sets of predefined questions designed to collect information and to recreate events.

Module 312 also helps a user to identify the strategy used. The system can save various strategies in its database with each one having specific features. The module can capture the features of a strategy according to related rules and settings, identify a strategy by comparison, and provide interfaces for a user to modify a strategy.

Module 312 further identifies the potential issue. A user may ignore an issue expressed indirectly. The module may call related utilities to catch up various issues in a consultative session. The observation enhancement module 315 can call this module in post-analysis.

The rehearsal module 313 provides virtual environment for a user to practice particular aspects. The module helps a user to build virtual environment and to watch one's own performance repeatedly, gives comments and suggestions according to related rules, changes the way of saying, and uses different sentences. Through exercise, a user can practice how to handle various scenarios and learn how to respond correctly and promptly.

The experience module 314 lets a user build a sequence of events in a way that the user wants and go through the sequence of events repeatedly. People may want to change the some experience they obtained many years ago or plant some experience in their minds. The module provides interfaces for a user to build a scenario, to modify the scenario, and to handle events. According to user's requirement and expert's options, the module helps a user to deal with the scenario correctly until the user feels satisfied. Then, the module inserts user's responses into the animating images and displays the animating images repeatedly to enforce the experience that the user has just obtained and to increase user's confidence.

The observation enhancement module 315 reminds a user the important points that the user may ignore by displaying caption, dialog box, and symbols or by generating sounds during a virtual exercise or during a review section. Depending on user's response, virtual object's behaviors, the words used, and the actions taken place, expert's opinions, expected words and expressions, user's settings, and the rules to catch up important points and verification, the module displays marks on related objects or the related portions of objects, gives some hint, or explicitly tells a user what the user has forgotten. The module can display what the user has observed in one color or in a specific way and what the user has missed in another color or in another way on spot or during a reviewing session. By reminding a user about what the user may ignore, the module can sharpen user's observation capability. For convenient, a user does not have to feedback all what the user has observed. Instead, a user can only input what the user wants to practice and ask the module to check these aspects only.

The evaluation module 316 provides indications about a user's progress by various methods. For example, the module can count the facial and body language that a user has noticed and has missed, detect the issues that the user has realized and has missed, and identify the meaning that the user has recognized and has lost. By determining the percentages that a user handles various issues correctly, the module compares the results with the ones obtained a period before and display the difference. The module can make good habits become part of natural habits by letting a user practice repeatedly and providing positive feedbacks. The module can provide opinions on how a user handles a particular situation according to the principles of various virtual experts in database and offer example and supporting materials.

The person module 317 provides interfaces for a user to track a human object, view mind migration graphically, and understand better how people react. The module displays a state diagram or diagrams in other form to indicate and track the change of people mind statuses so that a user can understand how other people think and react. Since these virtual human objects are models built according to real people, understanding these virtual objects will help a user to understand real people, peep their mind activities, and practice the ability to sort people into different kinds, observe people objectively, make proper adjustments, and reach good decisions. The module can display mind migration into a graduate process, identify the major features of mind activities, and show these features by proper indicators.

The "me" module 318 provides proper environment for a user to practice and train him or herself repeatedly on certain desired character or the way of handling things. One can consider this module as a special module of module 317. The module displays user's previous status, user's progress, and user's target goals in various forms. The module provides interfaces for a user to define the way of measure inner status, measures inner qualities, and displays the change of mind status. The module also provides comments and suggestions for a user to make further improvements according to the principles of various experts and captured information.

The database management module 319 provides interfaces and utilities for a user to manage a database, search for related information from the database, and display information in the database through various existing database technologies. The module can consist of an embedded database or link to a third party software. The information in a database includes the collected advices and their related examples, pictures and audio explanation, the rules for governing various operations, user's preferences, various setups for different modules and interfaces, various objects templates, various objects, and various utilities.

The viewing module 320 provides various interfaces for a user to observe the same events from different positions and from different points of views. A user can participate in an exercise or a practice by watching the behavior of virtual objects and then respond correspondingly. Having captured user's response, the system can replay what happened with user's image and voice inserted. This module also provides interfaces for a user to watch from a different direction. Upon receiving such request, the system regenerates images as well as voices according to user's selected viewing position. The viewing direction can be a fixed one or a dynamic one. In case of dynamic, the system can change viewing positions among several predefined viewing positions from time to time or the system can change viewing positions according to the viewing position rules. For examples, one can set the viewing position to view a person's face when the person is talking. The module can also let a user to view from eyes of a virtual human object or a virtual observing person. Since a different virtual human object has different settings and be sharp at different phenomenon, the module helps a user to understand other person's position better. The module can also mark major features about a chosen virtual human object on spot or list all the major features after a session.

The special consulting module 321 provides special consultative service to a particular user. Many advices usually have typical application situations. To simulate the real situations more accurately, a user can add some special consultative modules with corresponding information included. These modules can be for salesperson training, real estate agent training, trading agent training, and other special skill training. The module remembers user's status and provides interfaces for a user to build virtual human objects with some flexibility, to build scenarios, and to create rules for generating events and for specifying virtual object's response.

The event management module 322 builds events and manages events. The system may have corresponding event schedule templates for many commonly seen consulting topics. The module can provide interfaces and utilities for a user to build events with or without following templates and manually or automatically. The module can specify events or event templates in an event schedule template. A same description can have some variations. One method for creating variations is to change a word to its synonym and to change a sentence to a different form. The event specification in an event schedule template can associate with some rules to identify related events, modify events in required ways, and organize events. The module can also provide interfaces for a user to create an event schedule from scratch and specify related events. The module can further provide interfaces for a user to make a general event arrangement, to describe involved events, to generate events, to preview events, to modify events, to display image, and to produce sound.

The rule management module 323 provides interfaces and utilities for a user to define, organize, display, and edit rules and specify when and how the system will execute rules. First, the module provides interfaces to organize rules according to their categories, priorities, and properties. Rules are to handle tasks that need constantly update the way to handle them especially at the beginning of a practice or a new training session. Different kinds of rules control different processes involved by the system. The module provides interfaces for a user to register, organize, edit, split, and merge rules. A rule can be in form of high-level program language, regular expression, macro, patterns specification, and example. The system may embed related applications into the system or call related applications when needed. Depending on the properties of a rule, the module provides corresponding interfaces and utilities to edit, debug, and execute the rule. One can separate rules into various categories. For example, there are rules associating with event, rules associating with character, rules associating with type, and rules associating with partition. There are also rules for identification, rules for extraction, rules for collecting advice, rules for display advice, rules for generating event schedule, rules for adjusting event schedule, rules for event specification, rules for identifying event, rules for modifying events, rules for organizing event, rules for arranging event, rules for creating event, rules for creating variation, rules for inserting assistant event, rules for event synchronization. Further, there are rules for clarification, rules for forming search criterion, rules for search information, rules for identifying background, rules for categorization, rules for selecting example, rules for expressing idea, rules for providing instruction, rules for creating response, rules for analyzing response, rules for identifying important word, rules for identifying special word and phrase, rules for review, and rules for providing comment and suggestion, rules for viewing position. Moreover, there are rules for designing question, rules for extracting information from questions, rules for identifying character, rules for identifying type, rules for defining correlation, rules for naming, rules for combination, rules for making decision, rules for identifying emphasis, rules for identifying mode, rules for generating voice, rules for analyzing action, rules for recognizing facial expression, rules for making joint decision, rules for making interpolation, rules for registration, rules for identifying strategy, rules for suggesting improvement, rules for response fading, rules for creating self-perceived principle, rules for extracting feature, rules for identifying relation, and rules for extracting information from image and voice.

The logout module 324 saves customized environment for a user into a database. Depending on setting, the module can save more or less information. A user can just save the virtual environment, also save the initial setting of virtual human objects, further save the final status of virtual human objects, or even save the entire events.

The other modules 325 include all other subroutines or modules needed for completing various tasks and providing convenience for making operation easier.

Figure 4:
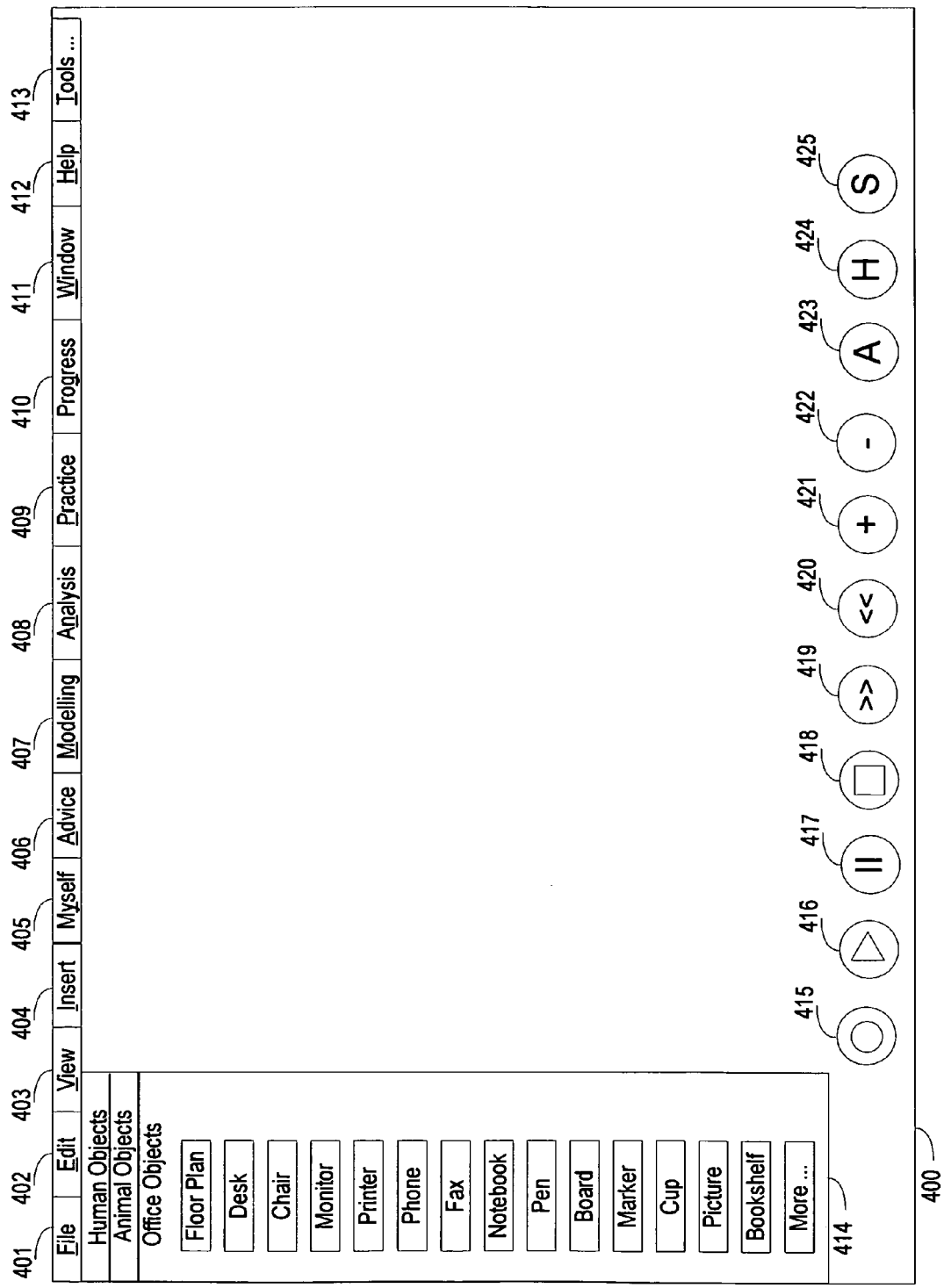
FIG. 4 illustrates a graphical user interface of the system.

FIG. 4 shows one of the graphical interfaces of the system. The menu, tool bar, and icons are for a user to perform various window-related tasks and the special system related tasks. The displayed window 400 has menu bar, tool bar, and icons. The menu bar has various commonly used menus such as File 401, Edit 402, View 403, Insert 404, Window 411, and Help 412. The menu bar can also include special menus such as Myself 405, Advice 406, Modeling 407, Analysis 408, Practice 409, Progress 410, and Tools 413. Each special menu has menu items to handle the tasks possible involved under each particular situation. At a particular moment, the system can make some of the menu items active and some of them disabled, depending on the availability. The Tools 413 provides more interfaces in form of menu.

The tool bar 414 has many commonly used models listed according to their categories. In this example, there are human objects, animal objects, and office objects. Under each category, there are sub-categories for more accurate description of the objects.

There may be icons to provide the convenience for a user to perform the most commonly used tasks. The icons can include the record icon 415 for recording a session, the play icon 416 for starting a new session and playing a recorded session, the pause icon 417 for stopping a recording session or a playing session temporally, and the stop icon 418 for ending a session. The icons can also include the forward icon 419 for moving fast to an advanced position, and the backward icon 420 for moving fast to a previous position. The icons can further include the zoom-in icon 421 for enlarging the image of a selected image portion, and the zoom-out icon 422 for reducing a selected image portion. There can be other icons such as advice icon 423 for asking immediate advice on spot, the help icon 424 for asking help related to the usage of related tool, and the search icon 425 for searching for information.

Control buttons, mouse buttons, special function keys of keyboard, special key combination, and special verbal command can associate corresponding commands. For example, a person can link a control button to speeding up and another to slowing down.

Figure 5:
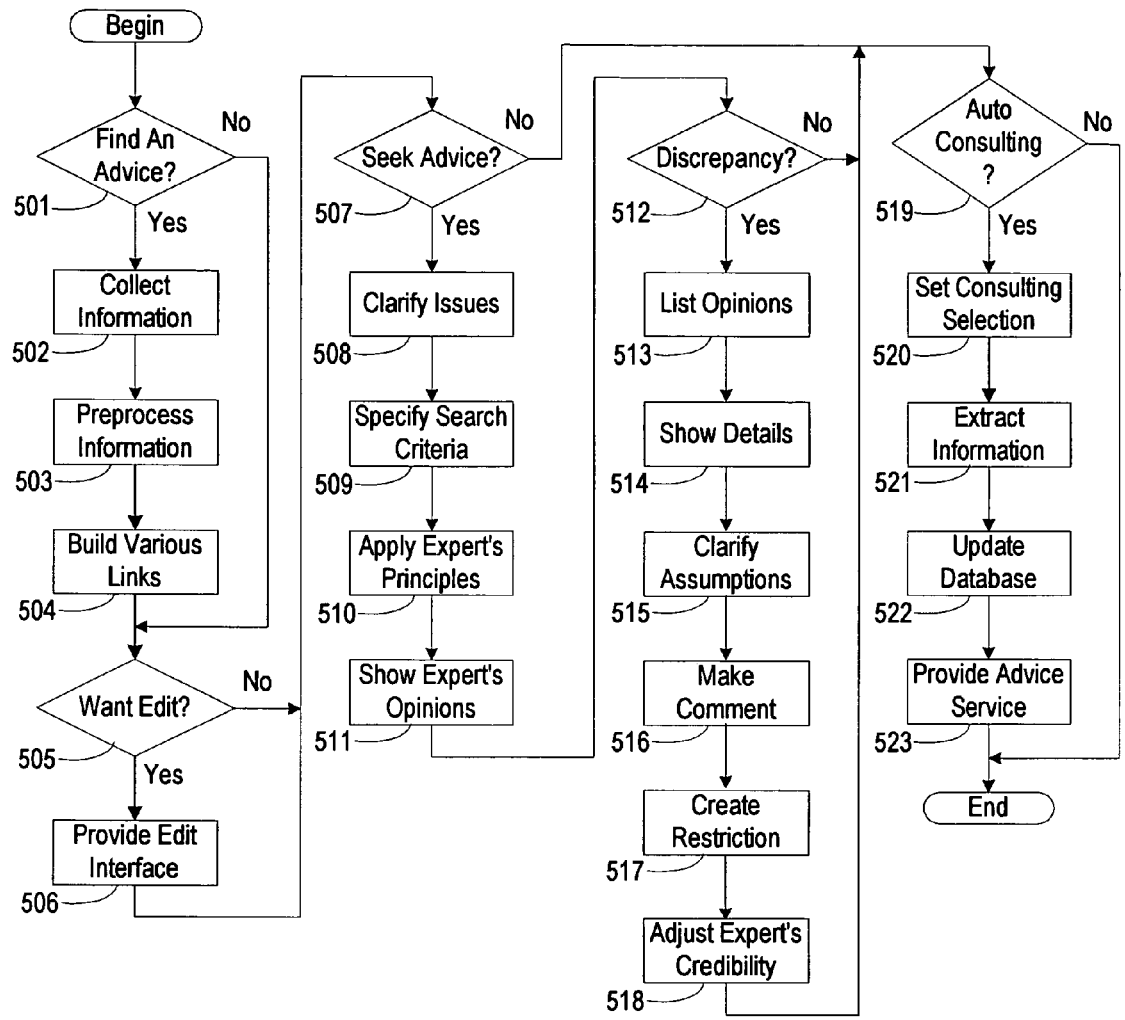
FIG. 5 illustrates an exemplary flowchart of the advice module 305 in FIG. 3.

FIG. 5 shows the flowchart of the advice module 305 in FIG. 3. It provides interfaces for a user to collect information, build links among different advices, search for information, compare different advices, display details, and make comments and offers advices in proper form and at proper time.

At step 501, the system checks that if a user wants to find an advice. If no, go to step 505 and otherwise, go to step 502.

At step 502, the system provides various interfaces for helping a user to clarify the information to be collected and to collect information from various aspects. Different types of advices may have different key aspects that need to fill. The system can ask a user some questions associated with each key aspect for clarification. These questions may associate with particular types of advice, fields of a table, or rules for clarification. For example, a rule can specify to display the related questions when a user inputs data to a field for the first time on a session. The system also provides interfaces for a user to collect the possible variations of an advice and its examples and to create one or more event schedules for a consulting session.

At step 503, the system provides various interfaces for helping a user to preprocess the information collected for each advice. This step can involve specifying the environment, the objects, and the handling method. The system can provide interfaces for a user to create variations according to user's understanding on the advice and related examples.

At step 504, the system provides various interfaces for displaying other advices under each category and helping a user to link an advice to related advices or link an aspect of an advice to other advices or related aspects of other advices.

At step 505, the system checks that if a user wants to modify an existing advice. If no, go to step 507 and otherwise, go to step 506.

At step 506, the system provides various interfaces for a user to modify advices, establish new links, delete unwanted links, attach pictures to corresponding advices, add voice explanation, and removed unwanted pictures, and voice files. The system can also provide interfaces for a user to modify the rules related to organization, search, and display of advices.

At step 507, the system checks that if a user wants to search for an advice. If no, go to step 519 and otherwise, go to step 508.

At step 508, the system provides interfaces for a user to specify what the user is looking for. Through these interfaces, the system can generate a criterion for searching database or create questions for further inquiry. At this step, the system collects information from a user about what is the issue and what the user is going to look for.

At step 509, according to user's specification, the system displays the search criterion. The system can also provide interfaces for a user to modify the search criterion directly. Then the system will search for related advices from its database as well as Internet.

At step 510, the system finds related experts according to the search criterion and applies expert principles on related issues. The system can provide interfaces for a user to specify the general rules for designing questions, extracting information from questions, and forming search criterions. The system can also provide interfaces for a user to design questions and search criterion directly.

At step 511, the system displays the expert's option according to the principles of each selected expert. Depending on settings, the system can display the same information in different ways for different users.

At step 512, the system checks if there is any discrepancy among the opinions of these experts. The system can find discrepancy according to keywords such as "yes" vs. "no" and "good" vs. "poor". The system can also provide interfaces for a user to tell the system if there is a discrepancy. If no discrepancy, go to step 519 and otherwise, go to step 513.

At step 513, the system lists expert's opinions in one or more forms.

At step 514, the system provides the detail about an expert's advice. The system can include the original advice, the original example of that advice, the current issue, the associated principles, and the reasoning process. The system can further provide interfaces for a user to modify related portions.

Sometimes the difference is due to the different assumptions made by experts. An expert may not tell a user about his or her assumption explicitly. Due to the different assumptions, the advices from different experts can be very different. By comparing different opinions and different reasoning processes, the system helps a user to notice the implicit assumptions of different authors. At step 515, the system provides interfaces for a user to append an assumption to a related advice.

At step 516, the system provides interfaces for a user to make comments on experts and their advisees. These comments help a user to remember the limitations of advices and credibility of experts.

At step 517, the system provides interfaces for a user to specify the restrictions on experts and their advisees for eliminating improper experts and improper advices in the future.

At step 518, the system provides interfaces for a user to adjust the credibility of each expert on related fields. Instead of passively taking any advice from all the books or tapes, a user can identify real good ones by comparison, applying their advices, generating feedback, and adjusting each expert's credibility.

At step 519, the system checks that if a user wants to have auto consulting. If no, end and otherwise, go to step 520. Depending on setting, a user may need automatic consulting during a practice or a rehearsal.

At step 520, the system provides interfaces for a user to select a consultative session. The system provides consulting to the user with the degree of automatic consulting depending on settings and related rules. The system can provide less or more details depending on need.

At step 521, the system extracts information from user's responses and the actions of the virtual people and search for related advices from selected experts.

At step 522, the system updates its database. The system saves user's responses and other information into the database for future reference.

At step 523, the system provides advices in proper formats. The actual formats depend on settings of a consulting session and available forms of an advice. The system can display an advice as text on a screen, through a speaker, or from the mouth of a virtual advisor, or by the gesture of the virtual advisor. The system can also suspend dispatching events temporarily and display an advice in details. Instead of providing an advice directly, the system can further provide a hint of an advice, its related examples in text forms, or a demonstration in animating forms. By capturing and analyzing user's response, the system can decide how to present an advice according to user's preference, setup, advice dispatching rule, particular requirement of the advice, and training arrangement.

Figure 6:
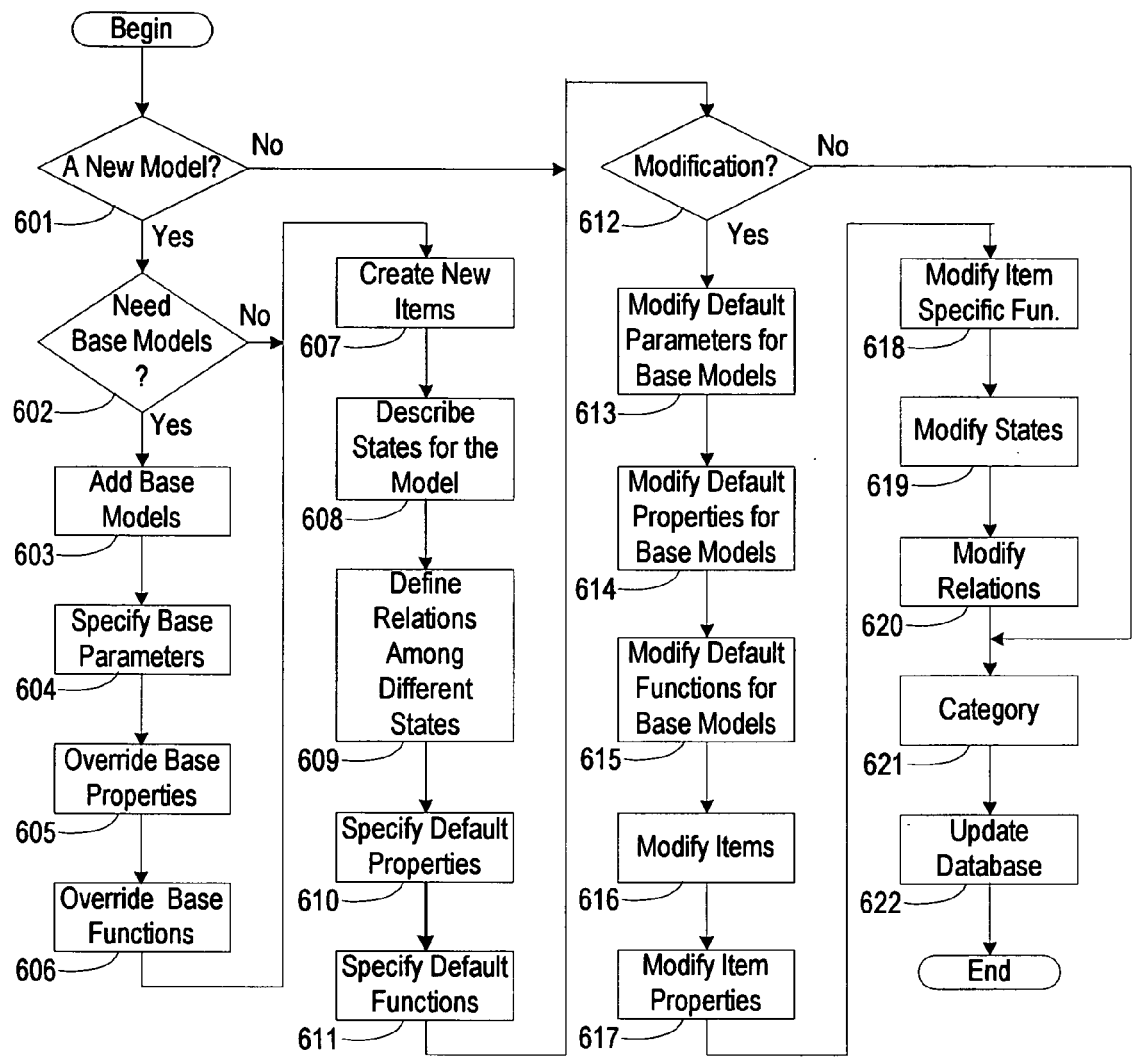
FIG. 6 illustrates an exemplary flowchart of the general model module 306 in FIG. 3.

FIG. 6 shows the flowchart of the general model module 306 in FIG. 3. The system provides interfaces for a user to build a general object model either from existing ones or from scratch. When built from an existing one, a child object will override the same properties or utilities of its parent objects. Further, the system provides interfaces for a user to modify default properties and default utilities, available appearances of an object, add related functions, create the relations among different objects, and specify their categories.

At step 601, the system checks that if a user wants to build a new model. If no, go to step 612 and otherwise, go to step 602.

A user can build a model from scratch or build one from some models already with desired features. At step 602, the system checks that if a user wants to build a model from other existing models. If no, go to step 607 and otherwise, go to step 603.

At step 603, the system displays available models and provides interfaces for a user to select desired models as base models.

Each base model may associate some parameters. At step 604, the system provides interfaces for a user to specify the parameters of each base model.

At step 605, the system provides interfaces for a user to override properties of base models.

At step 606, the system provides interfaces for a user to override functions of base models.

At step 607, the system provides interfaces for a user to create new items. An item can be an instance of a predefined model or a description of a specific aspect of an object.

At step 608, the system provides interfaces for a user to describe the possible states of the model. Standing for an object, a model can have one or more possible states. For example, a book may have three states: open, close, and tear down.

At step 609, the system provides interfaces for a user to define the relations among different states such as when and how one state will transfer to another state.

At step 610, the system provides interfaces for a user to specify default properties for some aspects of the object model.

At step 611, the system provides interfaces for a user to specify default functions for identifying objects, transferring status, and linking properties.

At step 612, the system checks if a user wants to modify a model. If no, go to step 621 and otherwise, go to step 613.

At step 613, the system provides interfaces for a user to modify the default parameters of base models.

At step 614, the system provides interfaces for a user to modify the default properties of base models.

At step 615, the system provides interfaces for a user to modify default functions of base models or to link to different functions.

At step 616, the system provides interfaces for a user to modify items. A user can change some properties associated with a particular item. A user can also add or delete items.

At step 617, the system provides interfaces for a user to modify item properties.

At step 618, the system provides interfaces for a user to modify item specific functions.

At step 619, the system provides interfaces for a user to modify states. A user may want to add a new state, activate an inactive state, disable an active state, and delete a state. A user can also specify the condition from a state change to a different state.

At step 620, the system provides interfaces for a user to modify relations among different objects. One special relation is the default relations. For example, if a person uses a hammer to hit a glass cup with force, the glass cup will be broken. The system provides interfaces for a user to specify relations between stimulus and effect. For convenience, the system can use Cartesian products or other forms more complex to describe the relations.

At step 621, the system provides interfaces for a user to specify categories that this model belongs. The user can sort an object model into one or more categories.

At step 622, the system updates its database. The system saves the modified object models into the database. These object models will serve as the templates for building objects.

Figure 7:
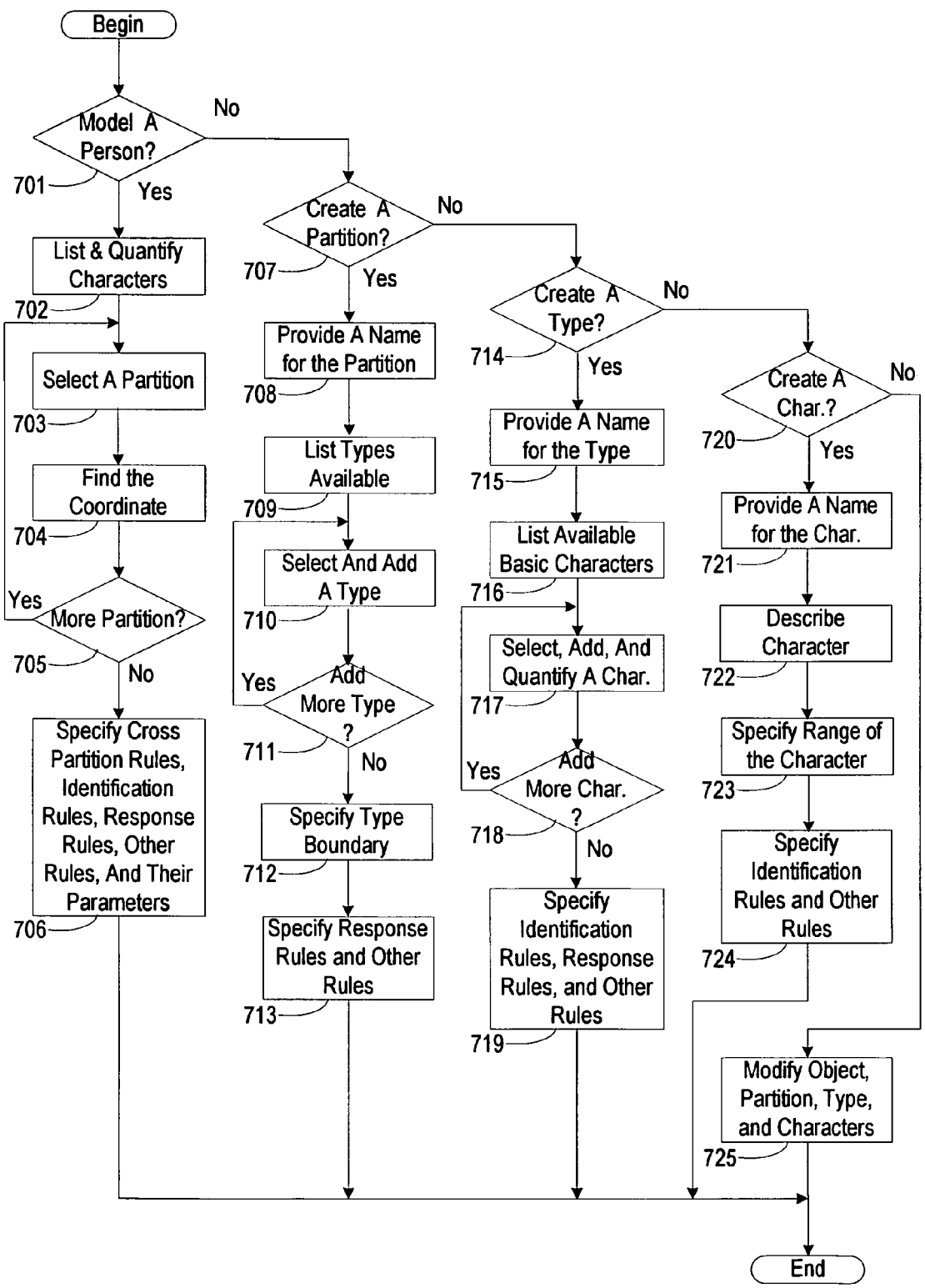
FIG. 7 illustrates an exemplary flowchart of the human model module 307 in FIG. 3.

FIG. 7 shows an exemplary flowchart of the human model module 307 in FIG. 3. The system can describe a human object by three layers: characters, types, and partitions. Here a character means a basic human factor. A type consists of one or more quantified characters for describing a typical feature. A partition is a description of human object for a particular aspect. First, the system provides interfaces for a user to specify various basic human characters and the rules for identifying these characters. Then the system provides interfaces for a user to specify types in terms of these characters to describe a feature consisting of one or several basic characters. Further, the system provides interfaces for a user to separate human object into different partitions with each partition consisting of several types. Finally, the system provides interfaces for a user to model a human by the coordinates of the person in each partition. Persons with different mind statuses and behaviors have co-ordinations different at least one of the partitions. Some partitions may have correlations among themselves. The system can also quantities the characters, types, and partitions according to psychology and other related subjects as well as fuzzy mathematics. The module can also include the utilities for modifying characters, types, and partition. An implementation can use less or more layers. For example, one can split a layer into two or more layers, combine two or more layers into a layer, or use both techniques.

At step 701, the system checks that if a user wants to model a human object. If yes, go to step 702 and otherwise, go to step 707.

At step 702, the system provides interfaces for a user to list all characters of a human object and quantify these characters. The system can also provide helps and interfaces for a user to list characters from various aspects and to specify relative degree of each character. The system can also provide utilities to estimate the degree of each character by asking a user a set of related questions, displaying related graphs, capturing user's feedback, and analyzing feedback according to a set of predefined rules for determining the degree.

At step 703, the system selects a partition. There can be several partitions with each one for describing a different aspect of a human object. Each partition has types that non-overlap on each other. Each type consists of one or several basic characters that a human object may have. These types consist of characters with fixed quantifications or fuzzy boundaries. For example, some people enjoy talking and some not. One can generate a partition based on liking talk or not. On real situation, since there is no clear boundary between talkativeness and taciturnity, a user may create a threshold or a rule to define talkativeness and taciturnity. Instead of either talkativeness or taciturnity, a user can further define multiple-statuses between talkativeness and taciturnity. Moreover, a user can define conditional criterions for talkativeness and taciturnity. The system can also provide interfaces for a user to apply fuzzy mathematics to describe the boundary among different types of a partition.

At step 704, the system finds the co-ordinate of the human object in a selected partition according to the correlations between the quantified characters and types under the partition. A co-ordinate will reflect the similarity between the human object and a corresponding type.

At step 705, the system checks if there is any more partition to consider. If yes, go to step 703 to select the next partition and repeat the process until no more partition. If no, go to step 706.

At step 706, the system creates cross partition rules, identification rules, response rules, specific rules, and the parameters associated with these rules according to the co-ordinates found in each partition, the response rules of each type under each partition, and the correlation among different partitions. The system can also provide interfaces for a user to specify these rules, their parameters, and the relations among different partitions manually. The identification rules usually depend on the joint decisions on the co-ordinates and occupy a certain volume in a high-dimension space with each partition as a dimension. Instead of making an absolute judgment, one can also describe the human object by fuzzy concepts.

At step 707, the system checks that if a user wants to build a new partition. If yes, go to step 708 and otherwise, go to step 714.

At step 708, the system provides an interface for a user to name the partition. The system can also generate a name for the partition automatically according to predefined partition naming rule or preference.

At step 709, the system lists all defined types. A partition can have some of these types.

At step 710, the system provides interfaces for a user to select a type and add it into the partition.

At step 711, the system checks if there is any more type that a user wants to add into a partition. If yes, go to step 710 and repeat the process. Otherwise, go to step 712. Theoretically, since there should be no any overlapping among the types under a partition and the summation of all types under that partition should cover all possible objects, there should be no need to find the distance from a human object to each type of a partition. Practically, for human object, since usually there is no clear boundary for distinguishing a type from other types under a same partition, these types may overlap each other a little bit. The system can use co-ordinates with more dimensions than needed as long as the way to find co-ordinates in a particular partition for various human objects will be consistent.

At step 712, the system provides interfaces for a user to specify the boundary among types under a partition. The boundary can be a determined separation or a fuzzy zone.

At step 713, the system generates rules for a partition according to the rules associating to each type. A generated rule can be the average of the corresponding rules of all types of the partition statistically or arithmetically. The system can obtain average results by scaling the rules of all types with weights corresponding to the correlations between a human object and the types under the partition. The system can also create average results by calling the rules of each type directly with the probability to select a particular type proportional to the correlation between a human object and that type.

At step 714, the system checks that if a user wants to create a new type. If yes, go to step 715 and otherwise, go to step 720.

At step 715, the system provides interfaces for a user to give the type a name. The system can also provide a name to the type automatically according to predefined rules.

At step 716, the system lists all available basic human characters contained in the system. Some examples of basic characters are merriness, sadness, talkative, and sharpness.

At step 717, the system provides interfaces for a user to select a basic character, add the basic character to the type, and specify quantification of the basic character.

At step 718, the system checks that if a user wants to add another basic character into the type. If yes, go to 717 and repeat. Otherwise, go to step 719.

At step 719, the system creates identification rules and response rules according to the quantification of each basic character in the type. An identification rule or response rule of a type can be the combination of related rules of every basic character with weights depending on the quantifications of each basic character.

At step 720, the system checks that if a user wants to create a new basic character. If yes, go to step 721 and otherwise, go to step 725.

At step 721, the system provides interfaces for a user to define the name for the new basic character.

At step 722, the system provides interfaces for a user to describe the basic character. A user can describe the character in text, in image, in number, or in other format.

At step 723, the system provides interfaces for a user to specify the range of the basic character. The user can define a range for the basic character from 0 to 100.

At step 724, the system provides interfaces for a user to specify the identification rules and other specific rules for the new character.

At step 725, the system provides interfaces for a user to display partitions, types, characters, human object, rules, and related parameters, and to modify them.

Figure 8:
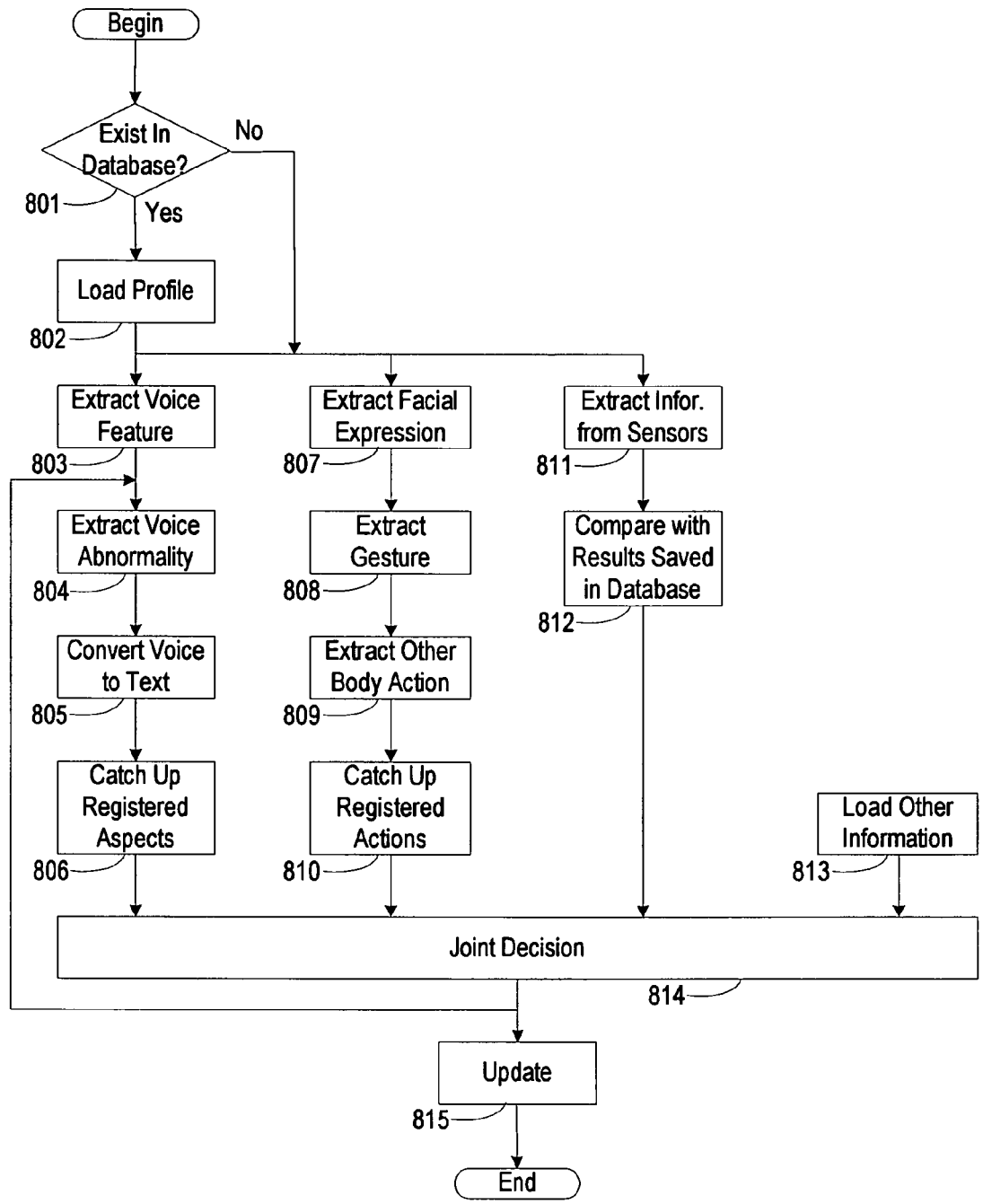
FIG. 8 illustrates an exemplary flowchart of the recognition module 308 in FIG. 3.

FIG. 8 shows the flowchart of the recognition module 308 in FIG. 3. First, the module identifies the information contained in voice, facial expression, gesture, and other sensors. Then the module makes a decision according to the information collected from different aspects.

The system processes the captured information by three paths. The first path processes voice, second path processes image, and the third processes information from other sensors.

At step 801, the system checks that if an object is in database. If yes, go to step 802 to load related information into memory and otherwise, go to one of these paths. The system will extract the information related to voice, image, and sensor.

The first path consists of step 803 to step 806.

At step 803, the system extracts features of voice such as volume, pace, and pet phase.

At step 804, the system tries to identify the abnormal features of voice by analyzing captured voice, extracting features, and comparing with those under a normal situation.

At step 805, the system converts the voice into text.

At step 806, the system identifies the registered aspects from the text. A registered aspect can be an important word, a special word, or a particular sentence. Having a dictionary and sentence patterns in its database, the system can obtain the literal meanings of a sentence according to words, their orders, and their relations.

The second path consists of step 807 to step 810.

At step 807, the system extracts facial expression from people under monitoring.

At step 808, the system extracts hand gesture.

At step 809, the system extracts other body actions. Many typical body languages can have general meanings, which sometime a person has not spoken out explicitly. The system can save the features or images of many common body languages and their associating meanings in its database. The system can also provide interfaces for a user to add a body expression and its meanings in its database.

At step 810, the system compares the captured image of a person with the images registered in its database to find out the general meanings of the captured image. If the person is in database already, the system can further compare the captured image with what saved in the system about the person. Instead of images, the system can compare the features of images.

The third path consists of step 811 and 812.

At step 811, the system extracts information from various sensors and monitoring instruments. The information from these sensors and instruments can provide objective information about the people under monitoring. Heart beat rate is an example of the information that the system can monitor.

At step 812, according to the information collected, the system compares the information with the one saved in its database. The saved information can be the recording under normal situations, standard recordings for average people, or the special recordings for particular people under various situations. The system can save the recordings or the extraction of recordings in its database.

There can be other information. At step 813, the system collects related information from Internet and other resource.

At step 814, the system makes a decision according to the information from different aspects and decision-making rules. The decision can be temporary or final. The decision can be temporary when the system has difficulty to determine a person's status at step 804 for the first time. After a temporary decision is made, the system can go back to step 804 to extract the abnormal voice feature and redo voice process one or more times.

At step 815, the system can update the decision about possible meaning of a human object.

Figure 9:
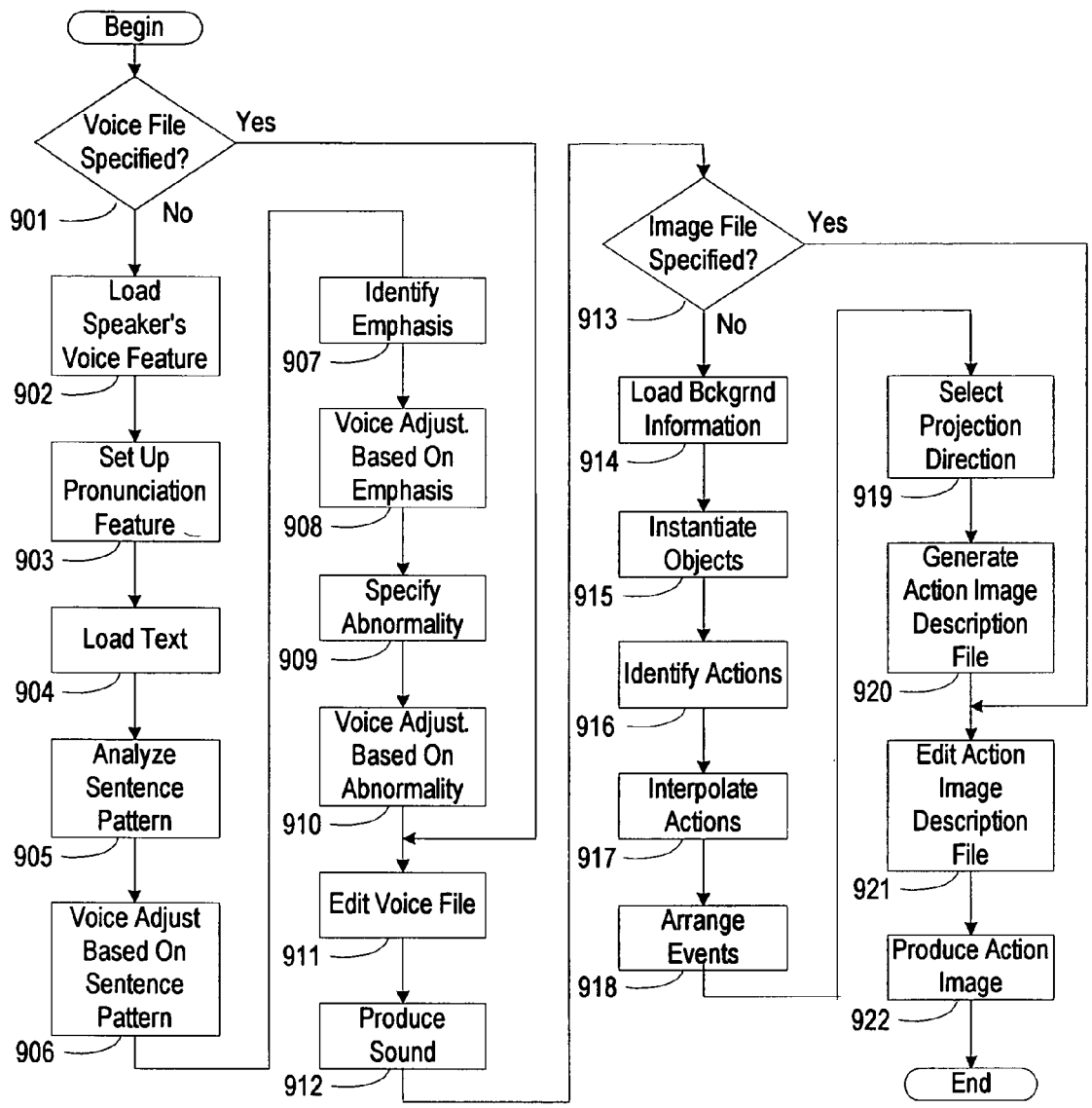
FIG. 9 illustrates an exemplary flowchart of the synthesis module 309 in FIG. 3.

FIG. 9 shows the flowchart of the synthesize module 309 in FIG. 3. The system generates voice according to the analysis results on a corresponding captured voice, the pronunciation features of a person, sentence patterns, and the particular sentences. The system creates image based on the typical reactions on a stimulus under a particular circumstance, the preference of a particular object, and the interpolation between actions. Then, the system provides interfaces for a user to modify voice and actions for meeting particular needs.

At step 901, the system checks that if a voice file is available. A voice file is a file with both the content and the way for generating sounds specified. If yes, go to step 911 and otherwise, go to step 902.

At step 902, the system loads the voice features of a speaker into the memory. If the object is a general person, one can select one of the voice models from database. Frequency range, regular frequency position, spoken speed range, regular pace position, volume range, and regular volume position are some examples of voice features.

At step 903, system sets up pronunciation features for a person. The system can provide interfaces for a user to specify how the system will produce a sound by locating a sound, modifying the pronunciation positions and processes, or substituting by a similar sound or similar sounds with each similar sound for a particular situation. The system also provides interfaces for a user to specify how tone, emphasis, and speed the system will change for different conditions. The system can further provide interfaces for a user to define pet phrases for a human object under particular situations.

At step 904, the system loads text that the system will pronounce voice into the memory.

At step 905, the system analyzes the sentence pattern of the text. Different sentence patterns may require different pronunciations for conveying information properly.

At step 906, the system adjusts the pronunciation according to the sentence pattern. The system can further adjust pronunciation according to the information contained in text.

At step 907, the system identifies the emphasis according to emphasis rules predefined or created by a user. Just as dealing with other rules, the system can have several emphasis rules with specific rules overriding general rules. There can be emphasis rules associated with different document styles and important words. The rules can be static or dynamic. A dynamic rule can generate voice for a same sentence differently under different situations. The system can also provide interfaces for a user to specify the portion of text that needs emphasis.

At step 908, the system adjusts voice according to the emphasis. According to the emphasis places and the rules for how to emphasize, the system will adjust the pronunciation for sentences.

At step 909, the system identifies the features that are not regular. The system depends on non-regular identification rules for finding non-regulars. For example, there can be rules for identifying if a person is laughing or crying based on the words for describing that person. A person may change one's voice a lot when that person speaks, laughs, or cries.

At step 910, the system adjusts pronunciation according to the abnormality. Upon identifying the abnormality, the system adjusts the way to produce voice according to the rules for controlling abnormal voice.

At step 911, the system provides interfaces for a user to edit voice file. The system can display voice in various forms, charts, curves, and marks, and provide interfaces and utilities for the user to make change.

At step 912, the system creates voice according to the generated voice file.

At step 913, the system checks that if an action image file is available. An action image file is a file containing information to generate image such as animating cartoon. If yes, go to step 921 and otherwise, go to step 914.

At step 914, the system loads background information from a database and Internet. First, the system finds the keyword for background by applying the background checking rules on related advices and their examples. Further, the system identifies a user. Then the system locates related information about circumstances, various virtual objects, and the user from Internet and the database. The system can also provide interfaces for a user to specify background information specifically, which includes background images for one or more different scenarios and provides utilities to find the proper background images for different circumstances according to background matching rules, which identify the different place as well as different time and then associate different scenarios with different background images. The system can further provide interfaces for a user to specify when to change background image by describing corresponding rules.

At step 915, the system makes each involved object more specific. According to the background information about each virtual object, the system sets the specific features for each virtual object and set other features as default values. For example, according to the information such as the height description about a person, the system will set up a height about the person. If the height has a specific number, the system will set up the height of person with that number. If the height is not specific and in some word such as "very tall", then the system will set the person with a height which can be considered as very tall in the circumstance of an advice or an example. If there is no any height related description, then the system can set the person with a default height, which can be a random value generated from a range of heights. Besides the appearance of each virtual object, the system can set each object its default actions. For example, based on the background information about a particular human object such as the accumulated history, the estimated coordinates in each partition, the general behavior for particular people, and circumstance, the system can create default actions from corresponding description. To produce specific actions, the system links these default actions to specific utilities or creates parameters to override default parameters and then calls some general utilities. The system can also introduce certain action variations in a certain range.

At step 916, the system identifies the actions involved. There are three kinds of actions. The first one is the one specified explicitly by the advices and their examples in verb and other action description means. The system can identify this kind of action according to action rules for extracting action from action related phrases, sentence patterns, as well as the relations among subjects, verbs, and objects. The second one is the one generated by the default action of a virtual object. Since the system generates this default action, the system can always know the action generated. The third action is the one generated by a user. The system can capture user image and analyze the action according to the rules for analyzing and capturing action.

The steps 915 and 916 can repeat many times for identifying action and setting up specific actions.

At step 917, the system interpolates actions to make action more smooth and reasonable for virtual objects. Usually regular advices and their examples only specify the most significant actions. If actions are not smooth enough or reasonable enough, the system can interpolate the actions based on circumstances and action interpolating rules. The system also provides interfaces for a user to specify how to interpolate actions under various circumstances.

At step 918, the system arranges events. One can consider an event as any thing that triggers an action. According to the actions identified as well as the time sequence and place information, the system arranges events. The system also provides interfaces for a user to specify event arrangement rules, which usually accords to time sequence and place information. The system can further provide interfaces and utilities for a user to specify the order of events. For events happening simultaneously at same place, the system usually can dispatch these events simultaneously. For events happens simultaneously at different place, the system can display these events one by one with some verbal explanation or text explanation or place each one in a corresponding window and display these events simultaneously.

At step 919, the system selects projection direction. The system needs projection direction to generate proper images and stereo sounds if the objects are 3D based or full view based. The projection direction can be a fixed one such as the one from a third person at a fixed position or a dynamic one such as the one switching back and forth between two persons in conversation. The system can have some icons on its window interfaces so that a user can change viewing direction at one's will, zoom in, and zoom out conveniently. One particular useful project direction is set to the eyes of a virtual human object or from the eyes of an imaginative person. The system also provides interfaces for a user to specify projection direction manually.

At step 920, the system generates action description file that the system or related application can understand to create images. The system can also provide interfaces for a user to check action by calling a related module or application to display image.

At step 921, the system provides interfaces for a user to edit the action image file. With interfaces, a user can change the event order and modify action images.

At step 922, the system generates the image on proper displaying device according to the action image file.

Figure 10:
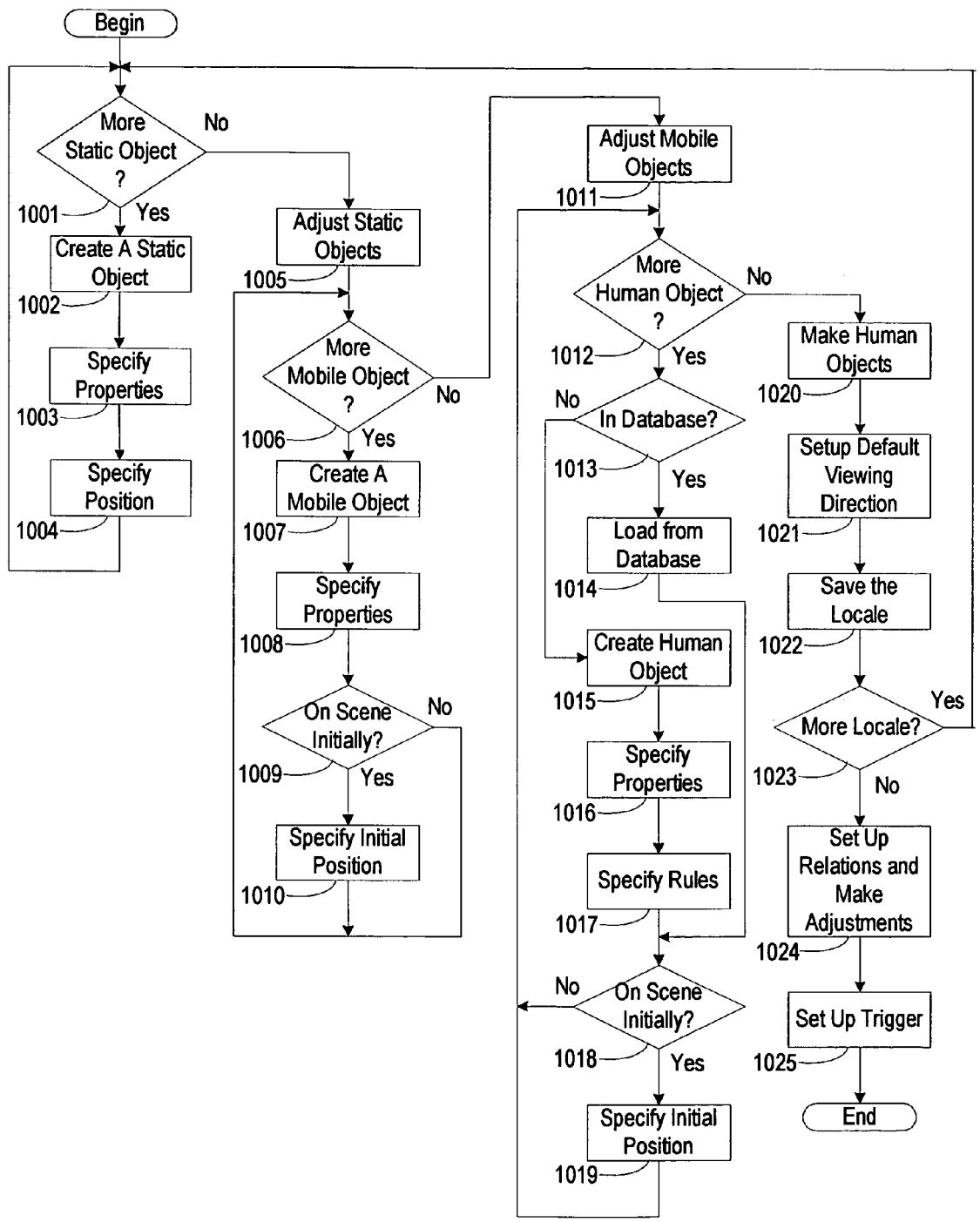
FIG. 10 illustrates an exemplary flowchart of the virtual environment module 310 in FIG. 3.

FIG. 10 shows the flowchart of the virtual environment module 310 in FIG. 3. The system provides interfaces for a user to add static objects by selecting static objects, specifying the properties of each static object, and defining the position of each static object. Then the system provides interfaces for a user to add mobile objects by selecting mobile objects, setting properties, and specifying initial positions if they are initially on the scene. Further, the system provides interfaces for a user to add human objects, set properties and related rules. Finally, the system provides interfaces for a user to override the relations among objects and set up default viewing directions.

At step 1001, the system checks if there are more static object needed to add. If no, go to step 1005 and otherwise, go to step 1002.

At step 1002, the system creates object. The system can create the object according to an existing object template or from scratch. The created object can inherit some properties from its templates or its base objects with other properties overridden.

At step 1003, the system provides interfaces for a user to specify properties of each static object. When the system builds an object from an object model, the object inherits many properties from that object model. This step lets a user modify some the properties to make an object different from others objects.

At step 1004, the system provides interfaces for a user to specify space relations among the static objects.

At step 1005, the system provides interfaces for a user to adjust positions of static objects. A user may want to change the locations of some static objects after the user has placed all objects that the user wants to add to a spot.

At step 1006, the system checks that if a user wants to add another mobile object. A mobile object is such an object that can move. It can be a human, an animal, or a vehicle. If no, go to step 1011 and otherwise, go to step 1006.

At step 1007, the system provides interfaces for a user to create a mobile object from a mobile object template or an existing mobile object.

At step 1008, the system provides interfaces for a user to specify properties for the mobile object. The mobile objects built from a same object template share many common properties. Since usually there are some differences among them, the step provides a chance for the user to specify the difference among these mobile objects.

At step 1009, the system checks that if the mobile object is on scene initially. If no, go to step 1006 and otherwise, go to step 1010.

At step 1010, the system provides interfaces for a user to specify the initial position of the mobile object initially on scene. Then go to step 1006.

At step 1011, the system provides interfaces for a user to adjust positions of mobile objects and their properties. A user may want to change the locations as well as the properties of some mobile objects after the user has put all the user wants on the spot.

At step 1012, the system checks if a user wants to add another human object. If no, go to step 1020 and otherwise, go to step 1013.

At step 1013, the system checks if a particular human object is in database. If no, go to step 1015 and otherwise, go to step 1014.

At step 1015, the system provides interfaces for a user to build a human object from an existing human object template or from scratch.

At step 1016, the system provides interfaces for a user to set up properties.

At step 1017, the system provides interfaces for a user to specify related rules.

At step 1018, the system checks that if the particular human object is on scene initially. If no, go to step 1012 and otherwise, go to step 1019.

At step 1019, the system provides interfaces for a user to specify initial position.

At step 1020, the system provides interfaces for a user to adjust positions of human objects and their properties. A user may want to change the locations as well as the properties of some human objects after the user has put all of them on the spot.

At step 1021, the system provides interfaces for a user to set up default viewing directions. The direction can be a fixed spatial position or several spatial positions that can change automatically or from a virtual observer's eyes.

At step 1022, the system saves the locale with prompt for a user to define a name for the locale, create a name according to default naming rules, or use one of the predefined names.

At step 1023, the system checks that if there are more locales to add. The system can do this according to user's feedback and the extracted information that relates to place and scenario. If yes, go to step 1001 and otherwise, go to step 1024.

At step 1024, the system sets up relations among various objects and makes adjustments on object's initial positions, various properties, and so on.

At step 1025, the system finds the trigger event, which is the first one to generate. The system can identify trigger event according to the information collected such as which object makes the first action. A user can also specify the trigger event or the rules for handling the inactive status in case there is no obvious evidence to specify which event will occur first.

Figure 11:
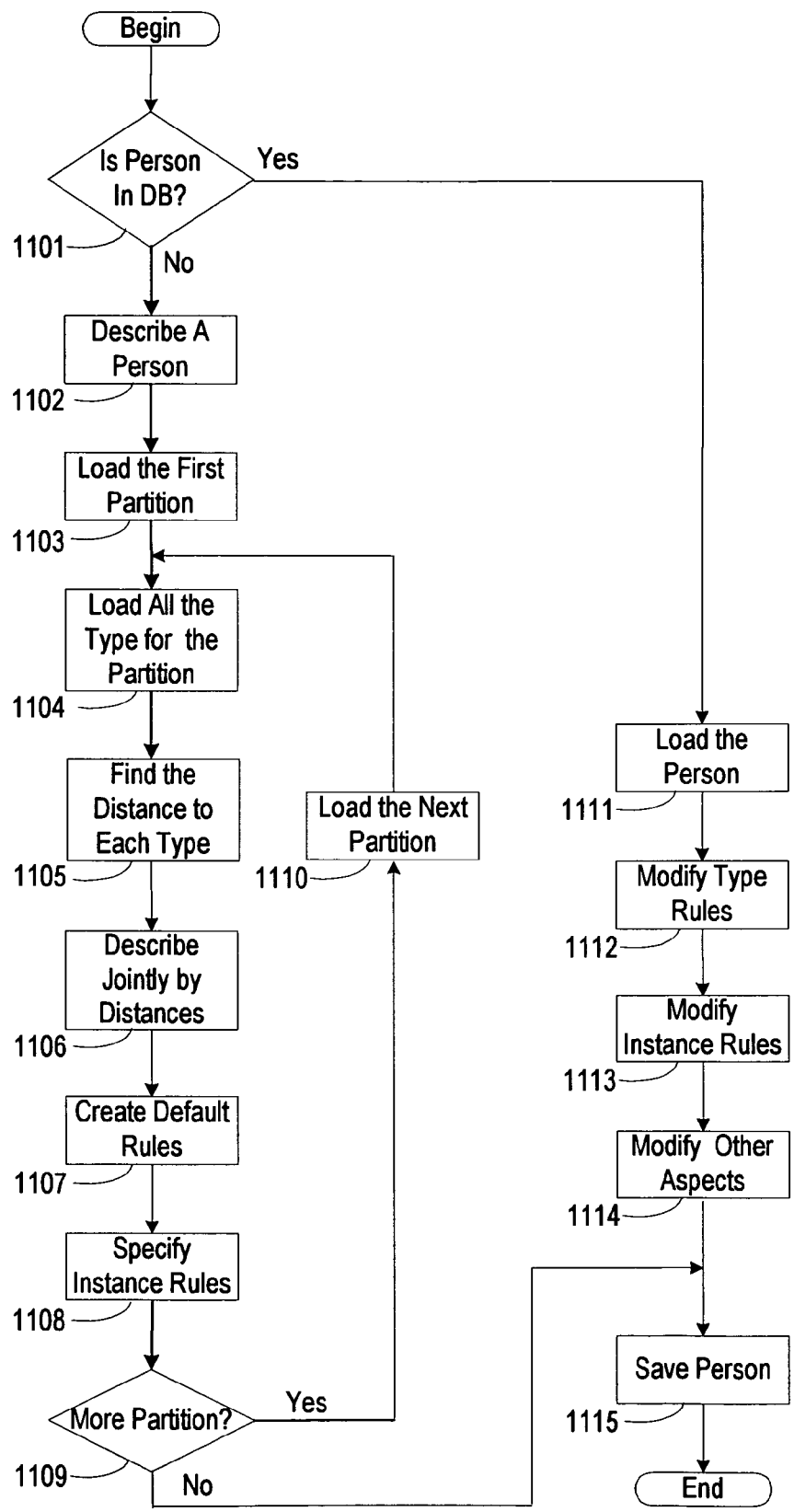
FIG. 11 illustrates an exemplary flowchart of the instantiation module 311 in FIG. 3.

FIG. 11 shows the flowchart of the instantiating a human object module 311 in FIG. 3. If the virtual human object is in its database, the system loads the virtual human object from its database and provides interfaces for a user to do modifications. If not, the system provides interfaces for a user to describe the person and then find out the co-ordinate in each partition.

At step 1101, the system checks if the object in database. If yes, go to step 1111 and otherwise, go to step 1102.

At step 1102, the system provides interfaces to describe a person. The system can provide chart, form, and diagram for a user to describe a person with proper verbal help or text help. The system can further ask related questions for helping a user to do a full description, capture user's answers, and then analyze the answers. Depending on the nature of consulting, the system can provide different questions and tools. The system can also find a person's information from the description automatically, specify further constrains, and use the defaults if no any further description is available. The system can further extract information about a person from related examples by capturing words used and actions preformed.

At step 1103, the system loads the first partition about human object. One can describe a human object from many different aspects and one can consider each aspect as a partition.

At step 1104, the system displays all the types in the partition. A partition can have many different elements called types with each type is different from any other type and with no overlap or small overlap on each other.

At step 1105, the system finds out the co-ordinates of an object from each type. The system can do this according to the description of a human object and the information collected from a user through displaying form, chart, or text. The system can provide interfaces for a user to define correlation or similarity between each type and an object. The system defines distance as a number inversely proportional to correlation value or similarity.

At step 1105, the system estimates the distance of the object to each type according to the user input in the graphic, chart, or text.

At step 1106, the system provides interfaces for a user to describe the object by a set of co-ordinates for the object in each partition.

At step 1107, the system creates default rules. Each type may associate some properties and rules. According to the co-ordinate, the system creates new properties and default rules for a human object with weight inversely proportional to its distance to each type.

At step 1108, the system provides interfaces for a user to specify instance rules for meeting special needs.

At step 1109, the system checks if there are more partitions. If no, go to step 1115 and otherwise, go to step 1110.

At step 1110, the system loads the next partition. Then, go to step 1104 to repeat the process.

At step 1111, the system loads the human object into the memory.

At step 1112, the system provides interfaces for a user to modify the rules specific to the type of human objects.

At step 1113, the system provides interfaces for a user to modify the rules specific to this human object.

At step 1114, the system provides interfaces for s user to modify other aspects.

At step 1115, the system saves the human object into its database to replace an old human object or save as a new human object.

Figure 12:
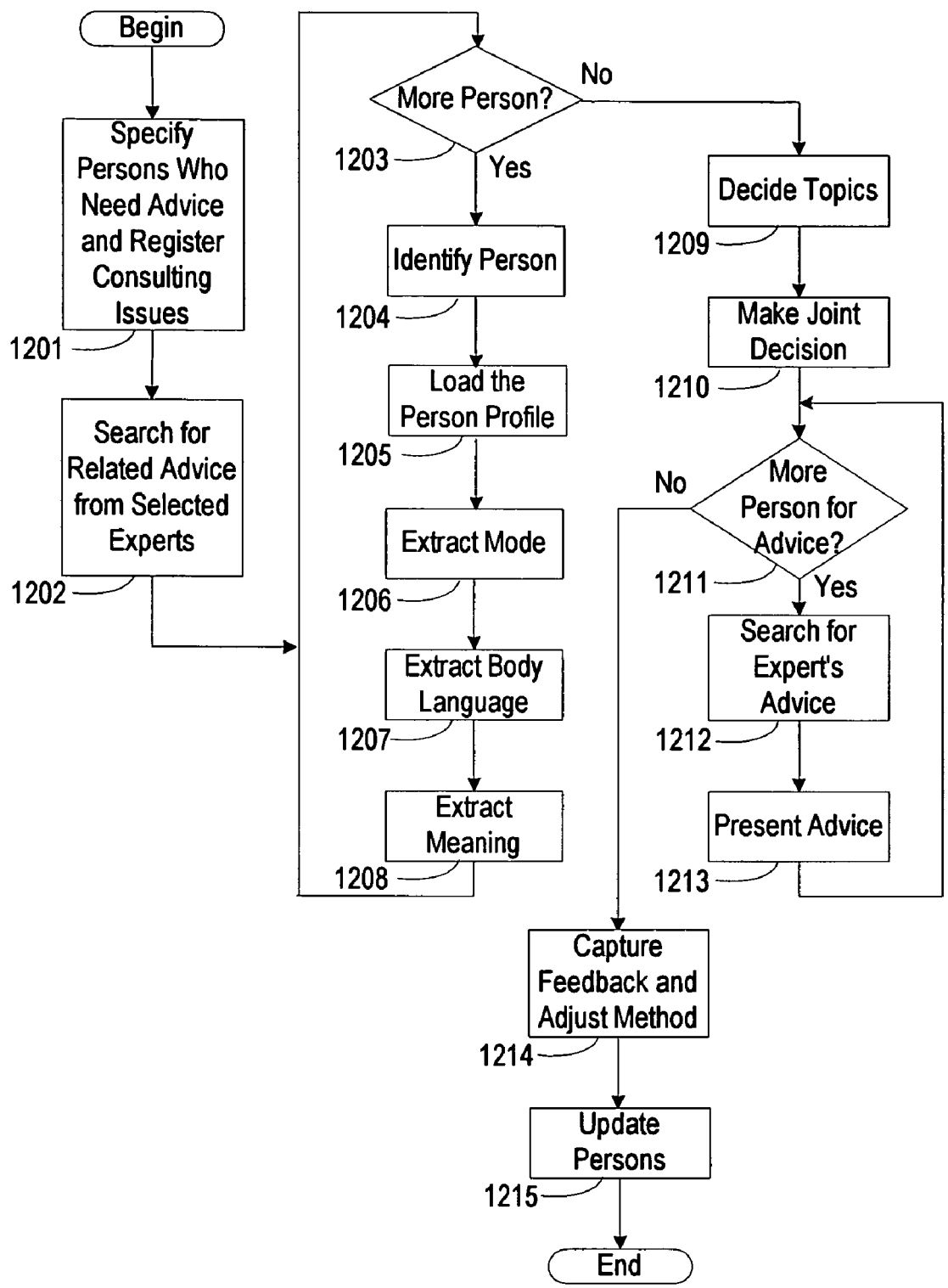
FIG. 12 illustrates an exemplary flowchart of the analysis module 312 in FIG. 3.

FIG. 12 shows the flowchart of the analysis module 312 in FIG. 3. First, the system provides interfaces for a user to specify that who needs advice and to register which fields need. Then, the system searches for related rules from selected experts. Further, the system identifies each involved person, loads related profile, extracts mode, body language and meaning, and makes a joint decision. The system searches for expert's advices and dispatches advices in proper form for the persons seeking consulting.

At step 1201, the system specifies the people who need advices for current session and registers which fields each person needs advices. Different people may need advices on different issues and even a same person may need advices on different aspects during different stages.

At step 1202, the system searches for related advices from selected experts. According to the fields that people seek consulting, the system searches for related advices and examples.

There are two kinds of people in a session. One is virtual persons and one is real ones. Real people behave in a way confined to normal behavior, society standard, and habits as well as some random factors. Virtual people behave in a way specified by related example, a consulting session, as well as general constrains. At step 1203, the system checks if there is any more person in the session. If no, go to step 1209 and otherwise, go to step 1204.

At step 1204, the system identifies the person according to the person's name, voice feature, body feature, and the words used. Since the system builds a virtual person, the system knows who that virtual person is.

At step 1205, the system loads the person's profile into the memory. The profile includes the information such as various voice features, mode, behavior habit, vocabulary, and pet phases.

At step 1206, the system identifies the person's mode. Usually the system can identify person's mode by checking if one's voice is normal or not, what emotional keywords used by the person, the way of speaking, the emphasis words, and sentence configuration.

At step 1207, the system identifies person's body languages such as facial expression and gesture according to the person's habit, background, and comparison between the features under a normal situation and the ones extracted from captured image.

At step 1208, the system captures the important words used and identifies the meanings of sentences and expressions. The subject topic, the collection of keyword for particular topic, the sentence patterns, and the emphasis determine if a word will be an important word. Besides the way of speaking and the emphasis words, the sentence configuration also conveys information about the person's attitude and other meanings. The similar sentences, one is in question sentence, one is in statement sentence, and one is in command sentence, have different weights to convey a same meaning. Further, some adjectives, adverbs and words as "could," "might" also contain different meaning.

At step 1209, the system narrows down possible topics. Under a field, there can be several different topics. By identifying words used, the system can further narrow down a subject or a field to a few possible topics.

At step 1210, the system makes joint decisions according to information collected. The system will use this information to select related advice.

During each session, one or more people may seek advice. At step 1211, the system checks that if there is more person seeking advice. If no, go to step 1214 and otherwise, go to step 1212.

At step 1212, the system searches for related advices and examples from selected experts.

At step 1213, the system presents advice in proper form. For example, the system can display a hint on screen, produce advice in sound, or display text. The system can also provide all the advices and suggestions after a session or on spot.

At step 1214, the system captures user's feedback. A user may want to change to a different consulting field or wish the system to present advice in a different way. Here the system provides a user such a choice.

At step 1215, the system can update the people's profiles for further reference.

Figure 13:
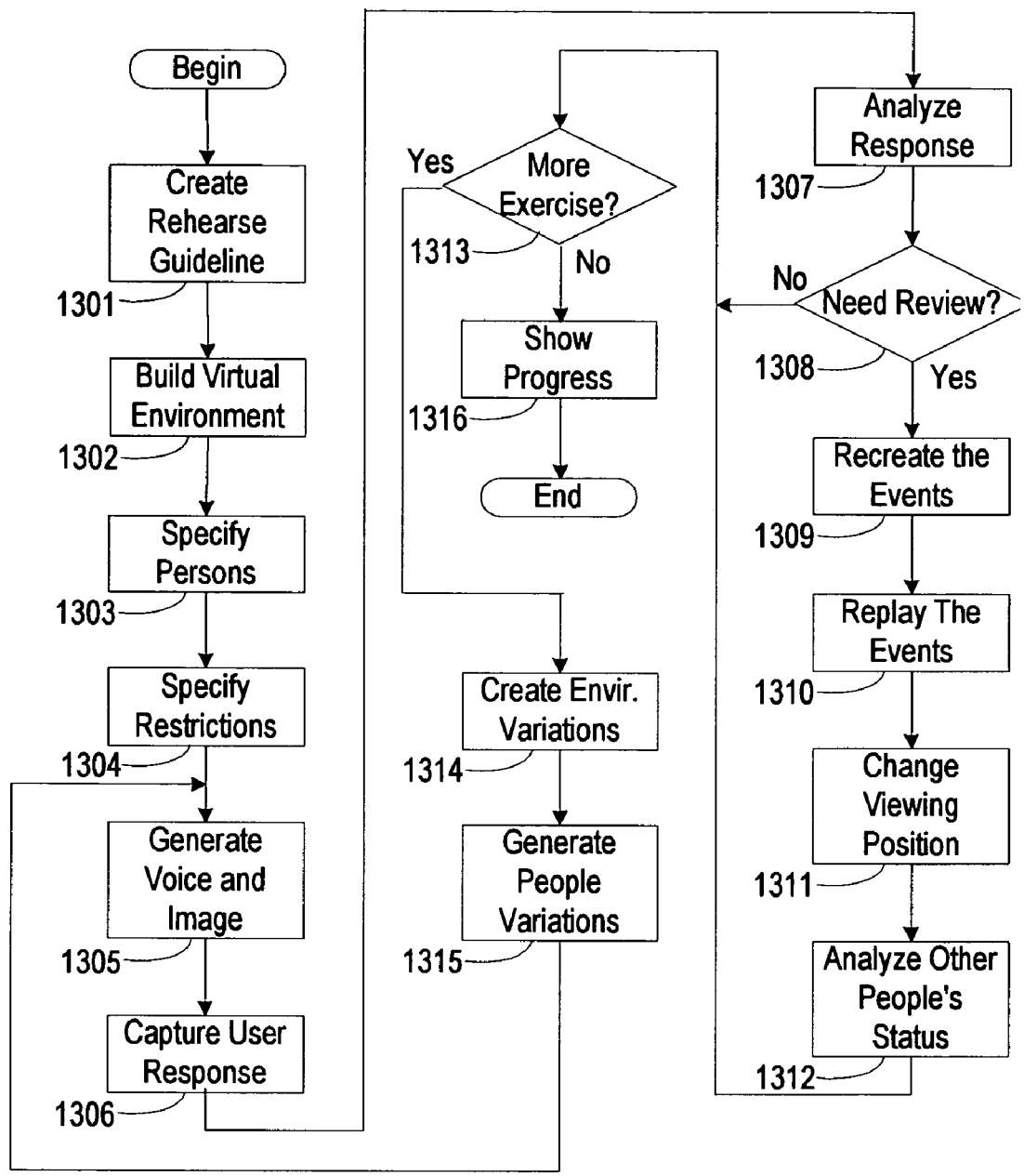
FIG. 13 illustrates an exemplary flowchart of the rehearse module 313 in FIG. 3.

FIG. 13 shows the flowchart of the rehearse module 313 in FIG. 3. The system lets a user build a virtual environment, specify virtual persons, define the restrictions, build general events guide, produce voice and image, and capture user's feedback. The system also provides an opportunity for a user to play a recorded session, view from different positions, and analyze other people's status. Furthermore, the system lets a user practice as many times as the user wants with some variations on environment and people. Through repeated training with advices from related experts, a user can behave more natural and more skillful and respond faster and more proper on similar situations.

At step 1301, the system provides interfaces for a user to specify the rehearse guideline. This guideline can include anything for guiding the system to develop, arrange, and dispatch events. For example, the guideline can specify how many persons involved, define the type of each virtual person, indicate some persons as the ones saved in its database, and describe the environment.

At step 1302, the system loads virtual environment into memory from its database according to the rehearsal topic and user's requirements. It can also provide interfaces for a user to create a virtual environment from an existing environment model or from scratch.

At step 1303, the system creates the involved virtual persons according to the rehearse guideline and loads related profiles about persons whose models saved in the database. The system also provides interfaces for a user to modify persons and specify special features.

At step 1304, the system creates the general relations and restrictions on environment and person's behaviors according to the circumstance specified by the rehearse guideline. The system also creates special restrictions on environment and people's behaviors according to the rehearse guideline and user's instruction.

At step 1305, the system generates voice and images by dispatching events created according to the general rehearse guideline, environment, and restrictions.

At step 1306, the system captures user's responses. By capturing user's voices and images, extracting features from them, building voices and images, and inserting them into related events, the system can recreate a rehearsal session so that the user can replay the session and examine various aspects from different points of view.

At step 1307, the system analyzes user's responses. First, the system extracts significant features from user's responses and other virtual objects and forms proper parameters and arguments for predefined comparison utilities. Then, the system calls proper utilities to analyze how a user performs. Finally, the system provides advices and suggestions. In addition, after a user tells the system what the user is going to do, the system can provide specific suggestions by applying the principles of related virtual experts.

At step 1308, the system checks if a user needs review. If no, go to step 1313 and otherwise, go to step 1309.

At step 1309, the system recreates events. According to the captured user's responses and extracted features, the system creates a virtual user and actions of the user and inserts them into the events.

At step 1310, the system replays the modified events. The system regenerates voices and images from the modified events according to the current viewing direction.

At step 1311, the system provides interfaces for a user to change the viewing directions. The system also provides interfaces for a user to set a different viewing position or dynamic viewing positions. The system further provides interfaces for a user to set up and view the whole events from the eye of another person.

At step 1312, the system provides interfaces for a user to analyze other people's status. Depending on setting, the system provides various forms, charts, state diagrams, tables, texts, and sounds to indicate how other people feel and how mental process develops.

At step 1313, the system checks if there are more exercises. If no, go to step 1316 and otherwise, go to step 1314.

At step 1314, the system creates variations on environment within the general environment restrictions. The system also provides interfaces for a user to specify how to change the environment or to make the change directly.

At step 1315, the system creates variations for people within the restrictions specified before. The system also provides interfaces for a user to specify how the user wants virtual human objects to change or to specify the change directly. Then, go to step 1305.

At step 1316, the system shows user's progress and provides new directions for further improvement according to the information about all virtual objects, the extracted features of real objects, and the consulting principles saved in its database.

Figure 14:
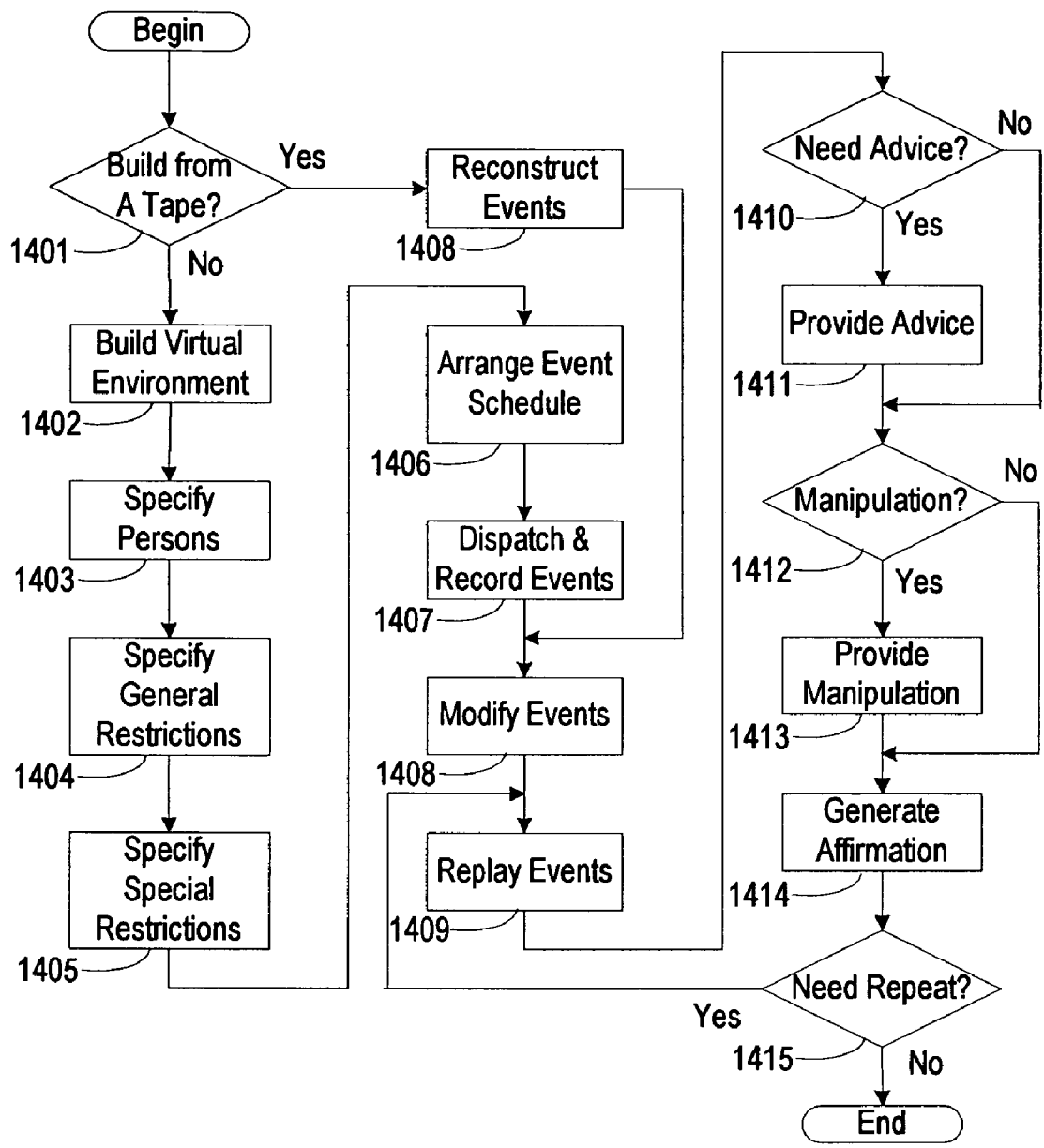
FIG. 14 illustrates an exemplary flowchart of the experience module 314 in FIG. 3.

FIG. 14 shows the flowchart of the experience module 314 in FIG. 3. The system creates events from a recorded tape or session and provides interfaces for a user to modify the events. Then the system lets the user play the created events, provides the user various advices, allows the user to manipulate events, and then repeats the process. The system further provides affirmation to help the user to attain experience.

At step 1401, the system checks if to build from a record such as a videotape. If yes, go to step 1408 and otherwise, go to step 1402.

At step 1402, the system provides interfaces for a user to build virtual environment and arrange events.

At step 1403, the system provides interfaces for a user to specify involved persons. A user can also specify the desired or ideal hero. For example, a user can specify the hero model the user would like to adopt for handling a particular kind of matter.

At step 1404, according to related rules, the system specifies general restrictions, which specify the general behavior for a situation or a society. The system can also provide interfaces for a user to specify and modify general restrictions.

At step 1405, the system defines special restrictions according to related rules. The system can provide interfaces for a user to specify the special restrictions on a particular object directly or indirectly.

At step 1406, the system arranges an event schedule by providing interfaces for a user to specify the event schedule or according to some predefined arrangement.

At step 1407, the system dispatches the events and records the events generated. Depending on implementation and setting, the system can dispatch events in voice and image directly or in computer memory indirectly.

At step 1408, the system provides interfaces for a user to modify the events. Through proper interfaces provided by the system, the user can change the viewing direction, the event order, events, and other aspects.

At step 1409, the system replays the modified events.

At step 1410, the system checks if a user needs advice. If yes, go to step 1411 and otherwise, go to step 1412.

At step 1411, the system provides necessary advices in various forms to a user.

At step 1412, the system checks if a user needs manipulation. If no, go to step 1414 and otherwise, go to step 1413.

At step 1413, the system provides interfaces for a user to manipulate. With proper interfaces, the user can change the way of how people talk, behavior, and appear. The system can also provide a user with necessary utilities to track events, slow down, and speed up.

At step 1414, the system provides a user positive confirmation on what the user has done well in various ways. When a user has satisfied with user's performance, or has obtained the agreement of the virtual expert, the user may want to repeat the experience many times for having better understanding and deeper feeling, and behaving more natural and skillful. The system can praise the user during each replay on different issues with different words, sentence patterns, and formats.

At step 1415, the system checks if a user wants to repeat. If no, end and otherwise, go to step 1409 and repeat the process.

Figure 15:
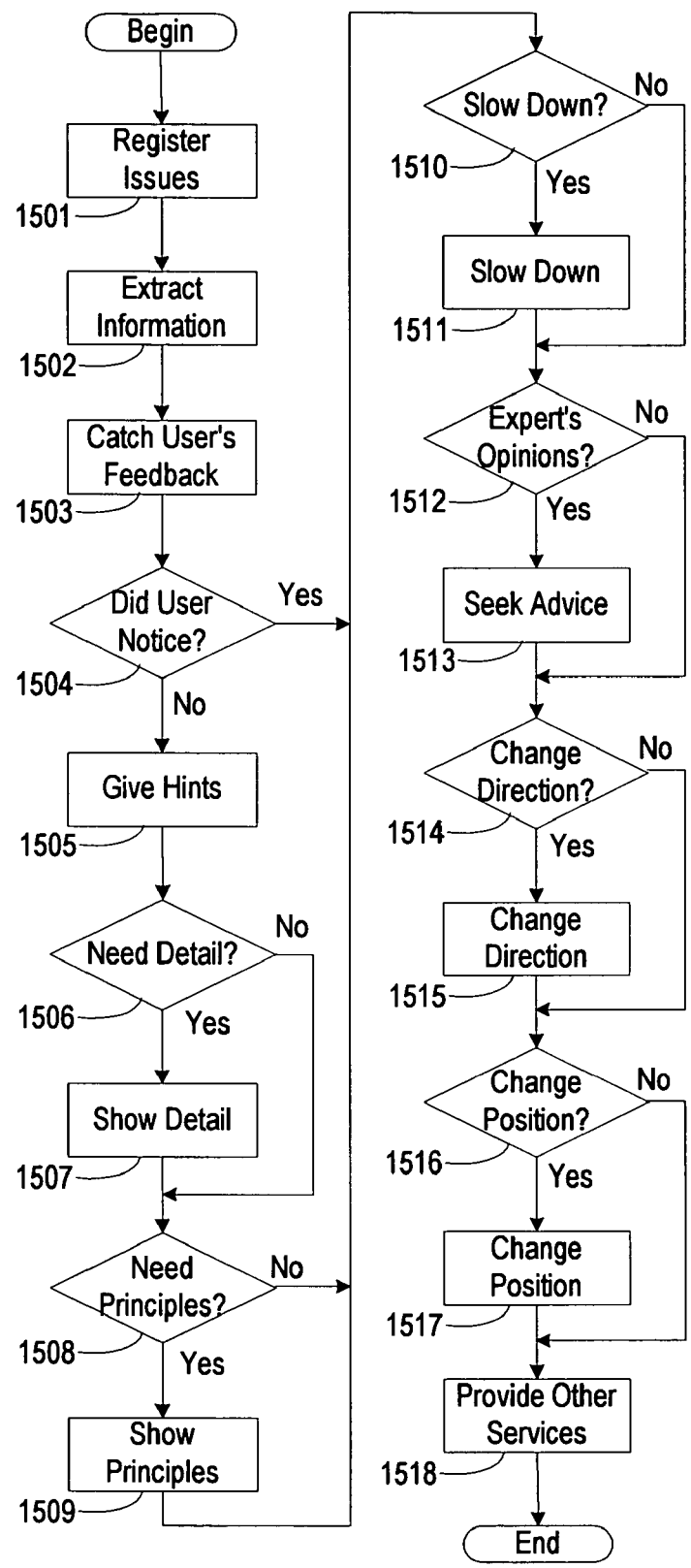
FIG. 15 illustrates an exemplary flowchart of the observation enhancement module 315 in FIG. 3.

FIG. 15 shows the flowchart of the observation enhancement module 315 in FIG. 3. First, the system lets a user register what kind of observation that the user wants to improve. Then, the system captures user's notice and compares user's notice with what the system captured or saved. Further, depending on setting, the system provides a proper way to inform the user about the ignored issues. The system also provides various utilities to help the user to notice the ignored issues as well as related issues.

At step 1501, the system provides interfaces for a user to register issues where the user wants to improve observation. For example, a user may want to gain sharper observation on facial expression and to become more sensitive on words and the ways of presentation. Each issue associates with one or more identifying rules. Depending on setting or rules regarding how to provide advice, the system provides corresponding help to the user.

At step 1502, the system extracts related information from user's action and other virtual objects. The system captures action, facial expression, special words, special tone, and special way of saying according to what registered. If the actions are the ones generated by the system, then the system can capture them though internal connection between phenomena and event description. If the actions are the ones generated by a real person or from a recorded session, the system can extract information and features according to related rules.

At step 1503, the system catches up user's responses on registered issues. There can be many different ways for a user to input user's responses. For example, the system can let a user press certain functions keys to tell the system about certain type of issues that the user has observed within predefined time limit after that issue first appears. The system can also let a user click certain icons on screen to tell the system that the user has noticed the issue. The system analyzes the response from a user to identify feedback.

At step 1504, the system checks if a user has noticed an importance issue. If yes, go to step 1510 and otherwise, go to step 1505.

At step 1505, the system gives the user some hints. The hints can be in various forms. The system can simply play a different tone for different type of issues, display different icons on screen, and display different words or letters for different issues.

At step 1506, the system checks if a user needs more details. If no, go to step 1508 and otherwise, go to step 1507.

At step 1507, the system shows details for the user in a second window or in a window inside original window.

At step 1508, the system checks if a user wants to see the related principles. If no, go to step 1510 and otherwise, go to step 1509.

At step 1509, the system displays the principles related to advices. These principles define how to identify the issues registered.

At step 1510, the system checks that if a user wants to slow down for having more time to respond according to user's direct request or some rules predefined. If no, go to step 1512 and otherwise, go to step 1511.

At step 1511, the system slows down the events, replays the events with slower speed and focus on the important aspects, or marks the important aspects to make user to see the potential important issues.

At step 1512, the system checks if a user wants expert's opinion. If no, go to step 1514 and otherwise, go to step 1513.

At step 1513, the system search for related advices. A user can also ask the system to display associated examples of an advice for temporary.

At step 1514, the system checks if a user wants to change viewing direction. A user may want to view an event from different directions. If no, go to step 1515 and otherwise, go to step 1515.

At step 1515, the system provides interfaces for a user to change viewing direction.

At step 1516, the system checks if a user wants to change position. Usually people can understand an issue better from different aspects or from different points of view. If no, go to step 1518 and otherwise, go to step 1517.

At step 1517, the system provides interfaces for a user to change the viewing positions.

At step 1518, the system provides a user other service. For example, the system can display the user progress and provide further suggestions on how to improve one's observation.

Figure 16:
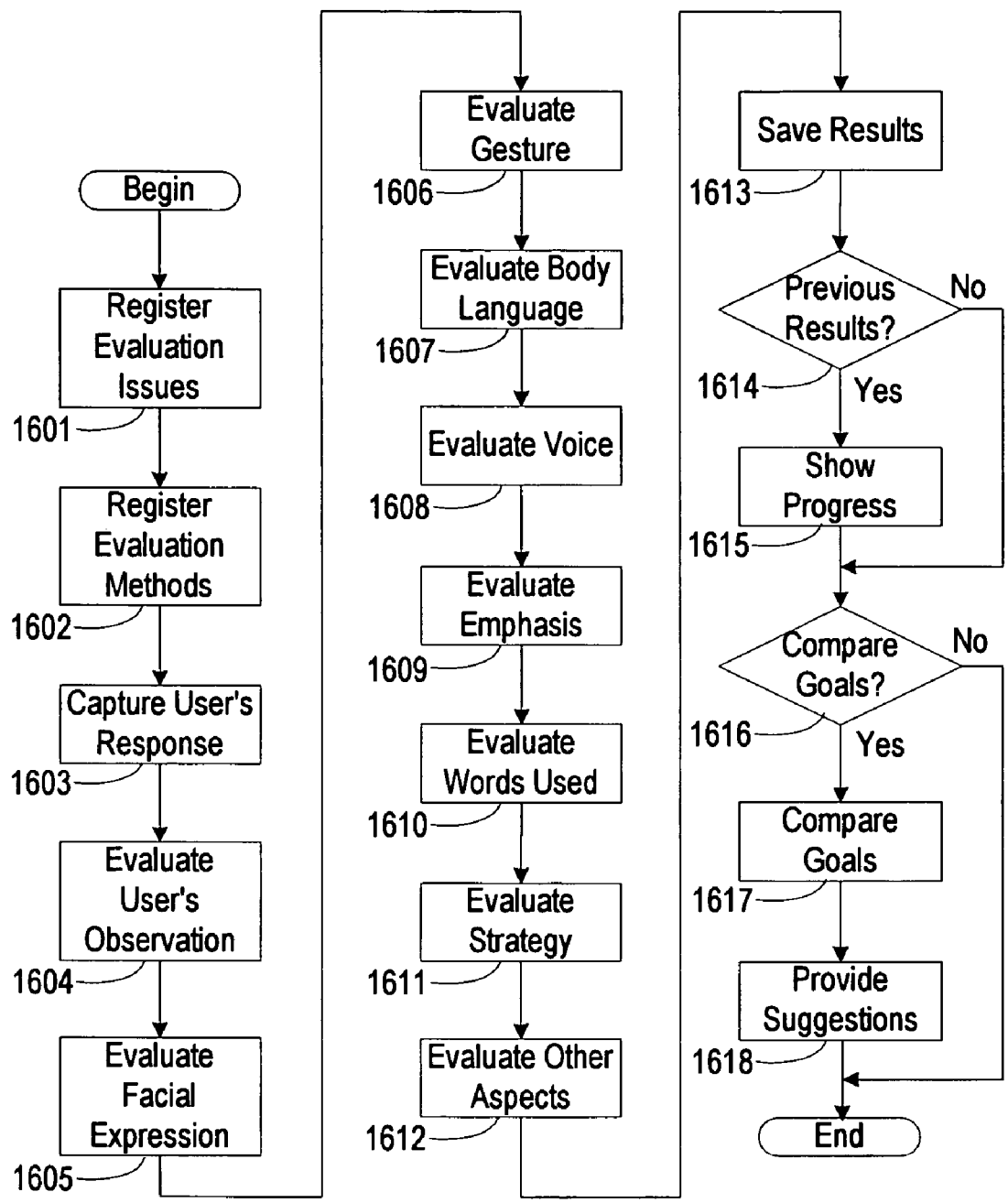
FIG. 16 illustrates an exemplary flowchart of the evaluation module 316 in FIG. 3.

FIG. 16 shows the flowchart of the evaluation module 316 in FIG. 3. First, the system lets a user register the fields to evaluate and select the evaluation methods. Then the system captures user's feedback and provides proper interfaces for the user to input. Finally, the system analyzes various aspects that the user has registered, displays user's progress, and provides suggestions for further improvement.

At step 1601, the system provides interfaces for a user to register fields to evaluate. Different people have different strengthen and weakness and therefore different people need improvement on different aspects. Even for a same person, he or she may need different improvements during different stages.

At step 1602, the system provides interfaces for a user to register the evaluation methods. There can be many ways to evaluate one's improvement in a particular field. The system provides interfaces for a user to specify one or several ways to evaluate one's progress and display the results in proper forms. There are two big categories to evaluate user's progress. One is to provide questions and then to get the answers from user. Another is to analyze user's action directly.

At step 1603, the system captures user's responses, which includes facial expression, hand gesture, verbal answer, keyboard input, and mouse activity.

At step 1604, the system evaluates user's observation by providing a set of questions or animating image to test how a user pays attention to what other people said, how much the user retains on what happens, if the user can identify various issues. The questions can be in any forms such as multiple choices. The image can be a section of original one with or without any modification.

At step 1605, the system evaluates user's facial expression according to related rules.

At step 1606, the system evaluates user's gestures according to related rules.

At step 1607, the system evaluates user's body language according to related rules.

At step 1608, the system evaluates user's voice according to related rules.

At step 1609, the system evaluates user's emphasis method according to related rules.

At step 1610, the system evaluates the words as well as sentences used.

At step 1611, the system evaluates the strategies used. There can be various rules for identifying specific strategies that the system has used. A user can use many different ways to address a same issue with each way for a different purpose.

At step 1612, the system evaluates other criterions. A user can set up these criterions to evaluate particular aspects.

At step 1613, the system saves the evaluated results in proper ways. For comparison purpose, the system can further quantity the results.

At step 1614, the system checks if there are previous results. If no, go to step 1616 and otherwise, go to step 1615.

At step 1615, the system shows user's progress in proper forms, charts, curves, and tables by comparing the results with previous results.

At step 1616, the system checks if a user wants to compare with the goal. If no, end and otherwise, go to step 1617.

At step 1617, the system compares the saved results with the goals set up by a user and displays the difference by various proper forms.

At step 1618, the system provides a user various suggestions according to compared results and some predefined rules for further improvement. The system also provides interfaces for a user to make comments.

Figure 17:
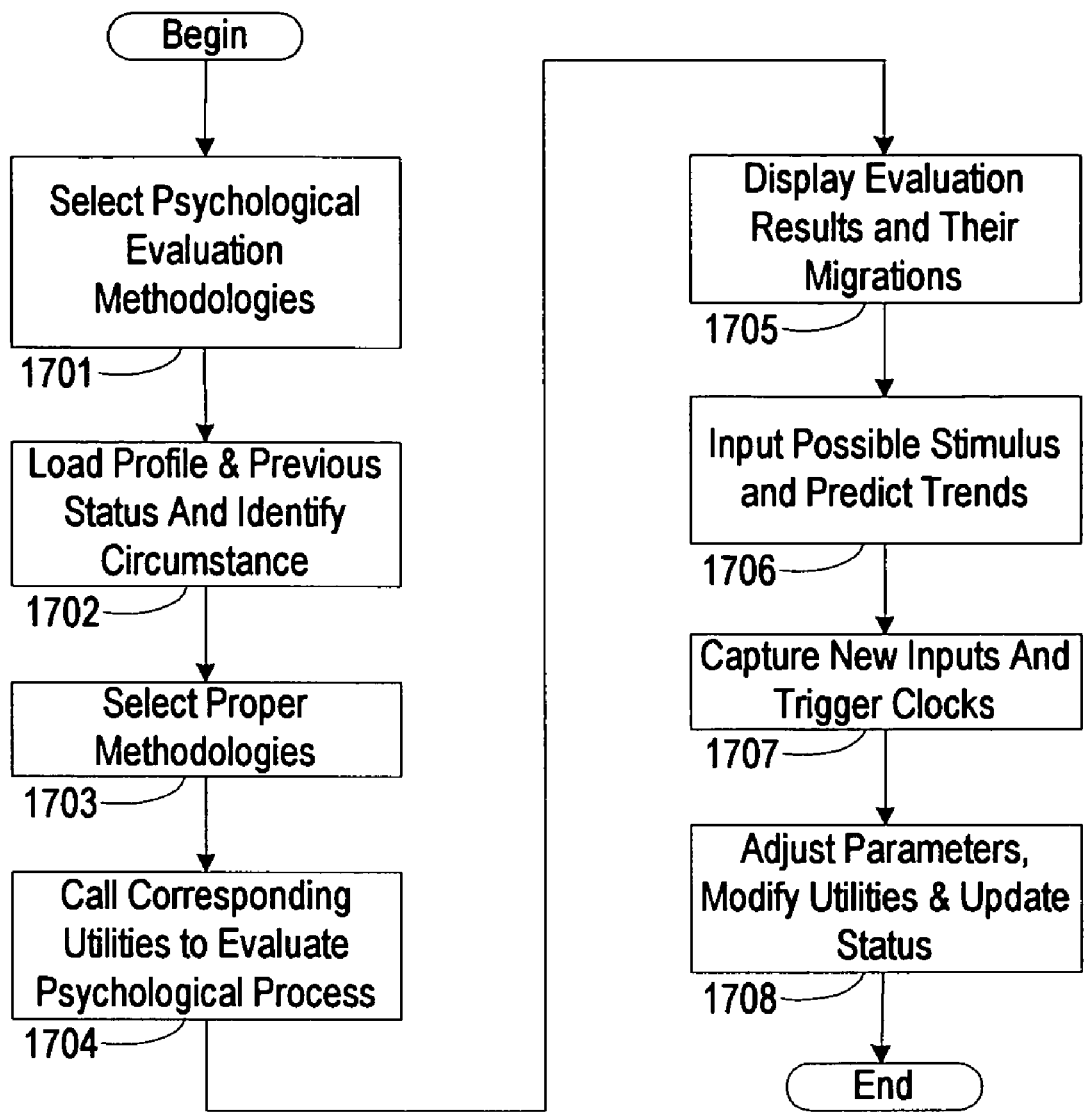
FIG. 17 illustrates an exemplary flowchart of the person module 317 in FIG. 3.

FIG. 17 shows the flowchart of the person module 317 in FIG. 3. This module provides information about the psychological change in a human object model and predicts for possible reactions. The system can do this according to the general psychological research, the specific psychological feature of the human object, and the circumstances. According to captured information, the system can adjust related parameters and utilities. The system can use various forms, charts, curves, and tables to show the migration of psychological status and let a user track mental status of a human object. First, the module determines the status of a human object according to previous status, environments, and other effects. Second, the module predicts possible responses or actions according to status of a human object, a possible stimulus, and a general behavior modeling of said human object. There can be general rules for normal analysis and special rules for a particular type of person and for a particular person. The prediction serves two purposes. One is for a user to analyze possible responses for a particular human object under certain circumstance and for the system to prepare events that the system has not fixed in an event schedule with several most possible actions available. When one of the possible stimuli does happen, the system presents its corresponding events.

At step 1701, the system provides interfaces for a user to select psychological evaluation methodologies. The system can also provide interfaces for a user to develop psychological evaluation methodologies according to various methods of psychology, which include the human general behaviors under certain circumstances, mental development, and mind activity emulation. These methodologies contain a set of related utilities to perform required tasks.

At step 1702, the system loads the profiles and previous statuses of related persons into memory from a database. A profile contains all the major personalities of a person under evaluation and a previous status contains the information about previous results of the person. The system then identifies the virtual environment where the events happen. The circumstance can affect a human object in various ways and can serve as one factor in evaluating people's response. The profile about a human object describes the previous status of the human object for both internal states and external states due to history.

At step 1703, the system selects proper methodologies to evaluate the person. The person's major characters, previous setting, and user's preferences determine the methodologies to choose. The system also provides interfaces for user to select methodologies.

At step 1704, the system passes related parameters and arguments to corresponding utilities to evaluate psychological process.

At step 1705, the system shows the current psychological status and its migration in forms, charts, table, state diagram, etc.

At step 1706, the system calls related utilities to predict possible trends by inputting possible stimulus, locating proper utilities, forming parameters and arguments, passing parameters and arguments to related utilities, obtaining results back from called utilities, and displaying the results.

At step 1707, the system captures new inputs from a user, other people, virtual human objects, and triggers related clocks. Different people have different feelings on a same stimulus and same people have different feelings on different stimuli. Also depending on the personality, different people need different length of time to recover from a same stimulus. The system provides interfaces for a user to set up clocks and related parameters such as attenuating time constant. The attenuating time constant depends on the personality of the involved person as well as the nature of involved events. There can be time fading rules for a particular type of stimulus and a particular type of human object. The system can also provide interfaces for a user to specify how time fading effect works by specifying specific instructions for a particular human object on particular stimulus under a particular environment.

At step 1708, the system adjusts parameters, and updates psychological models of related human objects according to the rules predefined, the results predicted, and what actually happened. The system can also modify the related utilities according to some predefined rules. The system can further provide interfaces for user to make manual adjustments.

Figure 18:
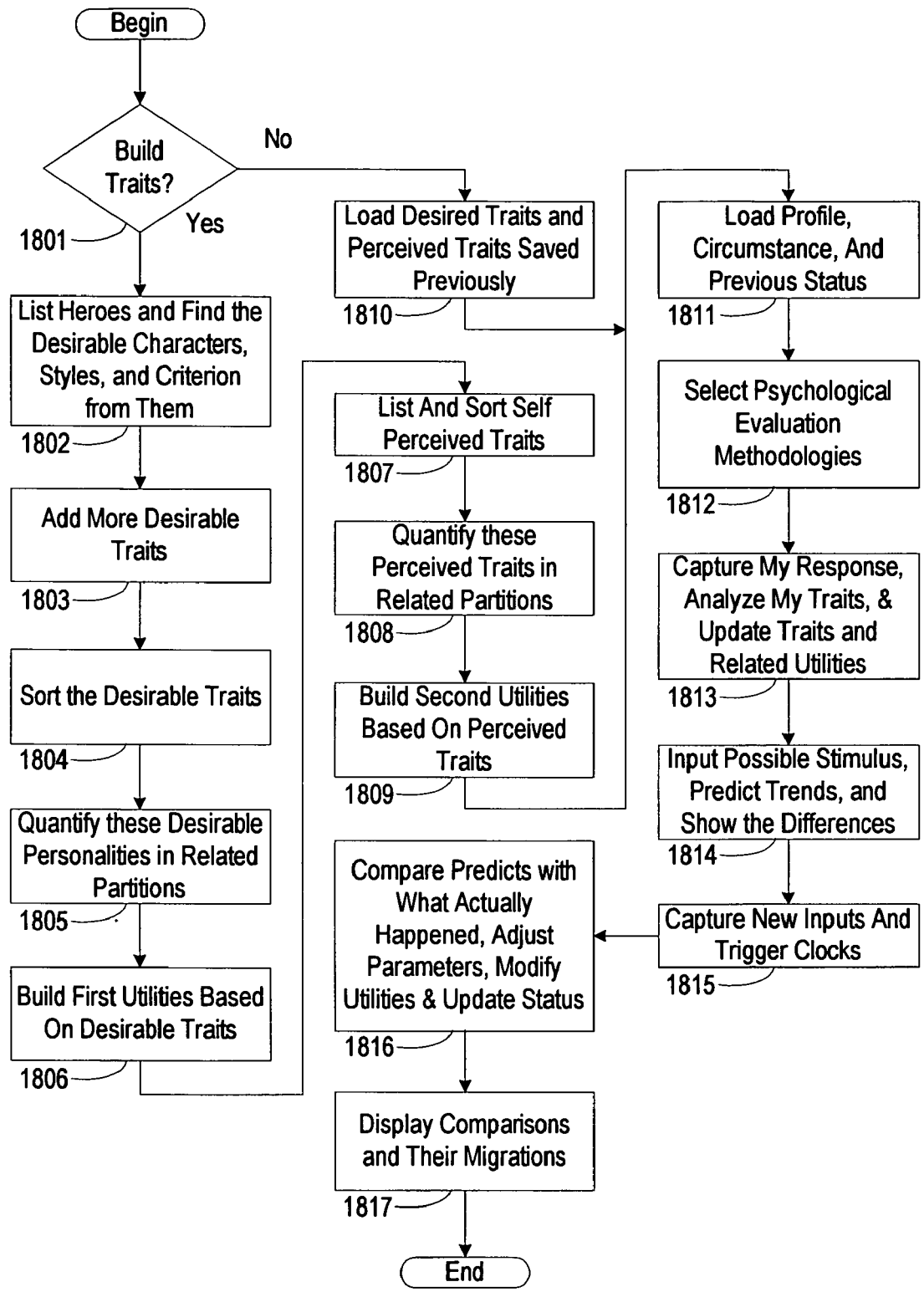
FIG. 18 illustrates an exemplary flowchart of the "me" module 318 in FIG. 3.

FIG. 18 shows the flowchart of the "Me module" 318 in FIG. 3. Here "me" means the person who uses the system to track one's own psychological change. There are two parts in the "me" module. One is the recorded "me" from real "me", and another is the desired "me". First, the module provides interfaces for a user to select the characters, styles, and handling methods for desired personality. The module also builds the real personality or self perceived personality from captured response or provided by a user. Then the system quantifies both desired personality and real personality by finding the co-ordinates in each partition. Finally, the module shows the difference between desired personality and real personality.

At step 1801, the system checks if a user wants to build the psychological related traits. If yes, go to step 1802 to build ideal traits and perceived traits. Otherwise, go to step 1810 to load related traits from a database.

At step 1802, the system provides interfaces for a user to list the heroes and find desirable traits from the heroes. The system can generate proper questions for guiding a user to locate user's heroes, identify traits, clarify rules, and build utilities. Some of the candidate heroes can be the experts collected in the database. The system displays related information about each expert and related aspects.

At step 1803, the system provides interfaces for a user to add more traits that are desirable. These new traits are not available on existing virtual experts.

At step 1804, the system provides interfaces for a user to sort desirable traits.

At step 1805, the system quantifies the traits by displaying interactive graph with initial positions specified and letting a user adjust the positions, or by asking user questions and getting feedback from the user. According to the feedback from the user or from default settings, the system then generates co-ordinates for each involved partition. These co-ordinates measure how far the object is from the types under a partition.

At step 1806, the system builds the first set of utilities according to the desirable traits and their co-ordinates in each partition. The system can call a corresponding utility or create a utility by combining the utilities corresponding to each type in that partition with weights inversely proportional to their distance to each type or according to some predefined rules on combination and weighting.

At step 1807, the system provides interfaces for a user to list self-perceived traits and sort these traits by various categories. These traits are what the user see about the user oneself or other person as "me". The system can ask a set of predefined questions for helping a user to find self-perceived traits. The system can also provide interfaces for a user to define rules to create self-perceived principles according to user's response to a predefined question.

At step 1808, the system quantifies the perceived traits for each related partition. The system provides interfaces to get user's feedback and generate co-ordinates.

At step 1809, the system builds the second set of utilities according to the perceived traits and their co-ordinates in each partition. The system can create a utility by combining the utilities of all the types in a partition with proper weights, which are inversely proportional to their distance to each type or follow some predefined rules.

If the desired and perceived traits are in database, then a user does not have to build one by the user. At step 1810, the system loads the desired traits and perceived traits as well as their quantified co-ordinates and associated parameters and utilities from a database.

At step 1811, the system locates profiles for related persons from a database, identifies the circumstances, and loads the previous statuses from a database.

At step 1812, the system selects psychological evaluation methodologies to predict the new status. User's preference, setting up, and the nature of things to evaluate determine which methodologies to use for predicting possible state. When "me" module changes from an old status to a new status, there can be actions accompanied.

At step 1813, the system provides interfaces to capture the person's responses, analyze traits, and update traits and their related utilities for desired "me" and perceived "me".

A user can also use the system to predict the different responses of desired "me" and real "me" on a possible stimulus. At step 1814, the system provides interfaces for a user to specify the possible stimuli, predicts the new status of desired personality and the new status of real or perceived personality, and shows their difference in proper formats.

At step 1815, the system captures new inputs from a user, other people involved as well as virtual human objects and sets up clocks with proper parameters. The clocks and their parameters reflect the remaining affect of particular stimulus. One of possible parameters is the half-effect attenuation factor of a human object, which is the time for a person to reduce the mental reflection to half the level of its maximum strength on a particular stimulus. The system can use any mechanic more complex to reflect the real situation more accurately.

On the same inputs, the system calls the utilities related to desire "me" and perceived "me". At step 1816, the system first compares the predicted results from perceived "me" with what really happened, and then adjusts parameters, modifies utilities, and updates the status. The system can update these parameters and utilities for perceived "me". The system can also provide interfaces for a user to adjust parameters and modify utilities.

At step 1817, the system displays the difference among real happened, predictions from the perceived "me", and predictions from the desired "me" as well as the statuses from the perceived "me" and the statuses from the desired "me".

Figure 19:
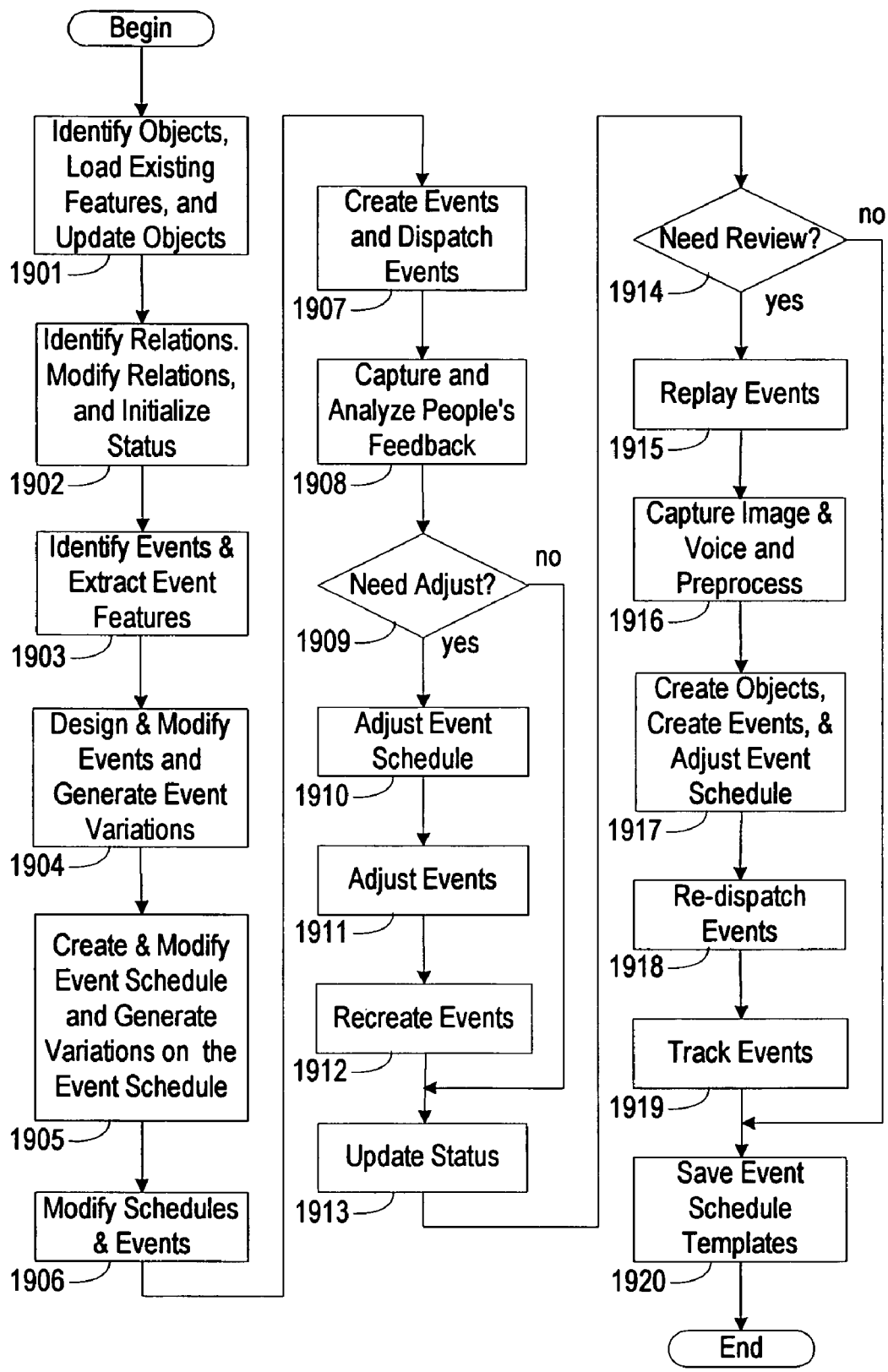
FIG. 19 illustrates an exemplary flowchart of the event management module 322 in FIG. 3.

FIG. 19 shows an exemplary flowchart of the event management module 322 in FIG. 3. The system provides various interfaces for a user to build an event schedule from an existing event schedule template or from scratch. Then the system generates various variations on event schedules and events. An event schedule has major events arranged in certain order and one or more possible responses for corresponding feedback. In case the feedback is out of the prediction in an event schedule, the system adjusts the event schedule and related events according to predetermined rules. The system is also able to let a user review one's own performance and other people's reactions by capturing people image and response from recorded video and audio signals, creating objects for people, generating corresponding events, adjusting event schedule, and re-dispatching events. A user can specify event roughly and let the default behavior to take place. A user can also specify event in detail and control the detail process. For example, a user can mark a "walk" event by specifying a human object to walk for a period at a particular moment in an event schedule. The user can further mark the pace of walk and step of each stride. For detail control, one can further specify the way of walking.

At step 1901, the system identifies objects involved in a consultative section. Usually an object is in the form of noun, pronoun, and special noun. According to related rules for extracting the features of objects, the system can extract related information from an advice and its examples. In some cases, there may be pictures associated with advice and its examples. The system can provide utilities designed to extract information from some particular type of pictures or for particular purposes. Having identified an object, the system can load the related features above the object from a database into the memory and initialize the objects with these features. In case of conflict, the information extracted from advice and its examples overrides the information saved in database. The system can also provide interfaces for a user to identify and specify object manually.

At step 1902, the system identifies relations among various objects. There can be some default relations among some objects, which the system saves in its database. One can categorize these relations in many different ways such as chronological relation, special relation, static relations, and dynamic relations. One can sort the rules for identifying the relations according to that if a rule is for general case, for a particular type of object, or for a particular object. The system can provide interfaces for user to specify relations manually. The system can also provide interfaces for a user to modify relations. Further, the system can initialize the status of an object, especial a human object according to the relations identified and the circumstances specified. The response from a virtual person depends on the initial status and the mind model of the virtual person, other people's reactions, and random factors.

At step 1903, the system identifies the events in an associated example or a consultative session. One can regard an event as a special dynamic relation. Usually an event can involve actions such as generating gestures and speaking. The system can identify events according to event identification rules and then the system further extracts information about a particular event from a database and Internet. The system can also provide interfaces for a user to identify events and specify events manually.

At step 1904, the system builds events according to the features extracted. The system can create events according to event generation rules or provide interfaces for a user to create events manually. The system or a user can build an event from a corresponding event template or from scratch. Then the system can provide interfaces for a user to modify these events. The system can also generate some variations according to predefined event variation rules or provide interfaces for a user to create variations manually.

At step 1905, the system creates an event schedule. The system usually arranges events according to their chronological orders, original appearance in the related examples, and spatial relations. There can be some rules for specifying how to generate an event schedule from scratch or from an event schedule template. The system can also provide interfaces for a user to make event schedule manually. The system makes alignment on events to make sure the events will co-ordinate each other according to event synchronization rules. For example, the system should generate actions and spoken words correspondingly. Besides, the system can insert some assistant events between some events for making event transition look smooth and natural. Again, the system can do this automatically according to certain rules predefined or manually by providing proper interfaces for a user to adjust timing, pace, and other factors. The system can generate variations from an event schedule automatically according to predefined rules or manually by user.

At step 1906, the system further provides interfaces for a user to modify event schedules and related events.

At step 1907, the system creates events according to an event schedule and related events involved in the event schedule. The system generates corresponding commands to create events. The events can be directly in form of image and voice such as for 2-D displaying. For a user be able to view events from different directions, the system can present events in some intermediate form and then create image and sound correspondingly according to a viewing direction at a particular moment. One intermediate form is the virtual objects and their actions created in computer memory for simulating objects and their actions in a 3-D space.

At step 1908, the system captures feedback from real people involving in a consultative session and analyzes the feedback. Some feedback can be straightforward such as the input from a keyboard or form a mouse. Some feedback can be more complex such as the facial expressions and conversations. The system uses various image-processing and voice-processing techniques to preprocess the information, extracts features according to related identifying rules, and then makes decisions. The system can further provide interfaces for a user to perform analysis, remember what a user has done, and learn from the examples offered by the user.

At step 1909, the system judges if there is any need to modify events and event schedule. The event prediction can be wrong, or there are too many possible events to choose. The system can do this according to the event schedule, related events, and corresponding rules for adjusting the event schedule. If yes, go to step 1910 and otherwise, go to step 1913.

At step 1910, the system adjusts event schedule according to related rules. The system can also provide interfaces for a user to adjust rules manually especially on a training stage for particular type of a consultative session.

At step 1911, the system modifies events by adjusting related actions involved in an event. The system can also insert an auxiliary event for producing smooth transition.

At step 1912, the system recreates events according to the adjusted event schedule and adjusted events. The system also makes recreated events synchronize to each other.

At step 1913, the system updates the statuses of objects especially the human objects involved. How to update the status of a human object depends on the initial status and mind model of the object, other people's reactions, and some random factors.

At step 1914, the system decides if a user wants to review. A user may want to review, analyze one's performance, and ask the system to provide analysis on certain people. If yes, go to step 1915 and otherwise, go to step 1920. If the user wants to review, the system can simply replay the recorded signal. The system can also provide modified signal from recorded signals by substituting real objects by corresponding virtual objects and let a user view from a different aspect.

At step 1915, the system replays the events recorded.

At step 1916, the system captures images and voice. The system can preprocess captured image and voice. Depending on settings, the system can simplify the objects with emphasis on major features of objects and actions. For example, the system can make objects funny to have cosmic effect.

At step 1917, from the captured image and voice or preprocessed image and voice, the system creates corresponding objects and related events by making use of various image and voice processing techniques and following certain rules. Then the system adjusts the event schedule to reflect the new virtual objects inserted and their actions.

At step 1918, the system re-dispatches the events according to the adjusted events schedule. A user can select a viewing direction to watch a consultative session.

At step 1919, the system provides various interfaces for a user to track events, objects, particular words, particular sentences, and particular actions. A user can further ask the system to provide helps on enhancing observation and advising on the use of words and gestures.

At step 1920, the system provides interfaces for a user to specify how to save an event schedule as an event schedule template and modify the event schedule template. One can generate an event template by deleting some events, replacing some events by corresponding event templates, adjusting event order, associating some events with related rules.

Figure 20:
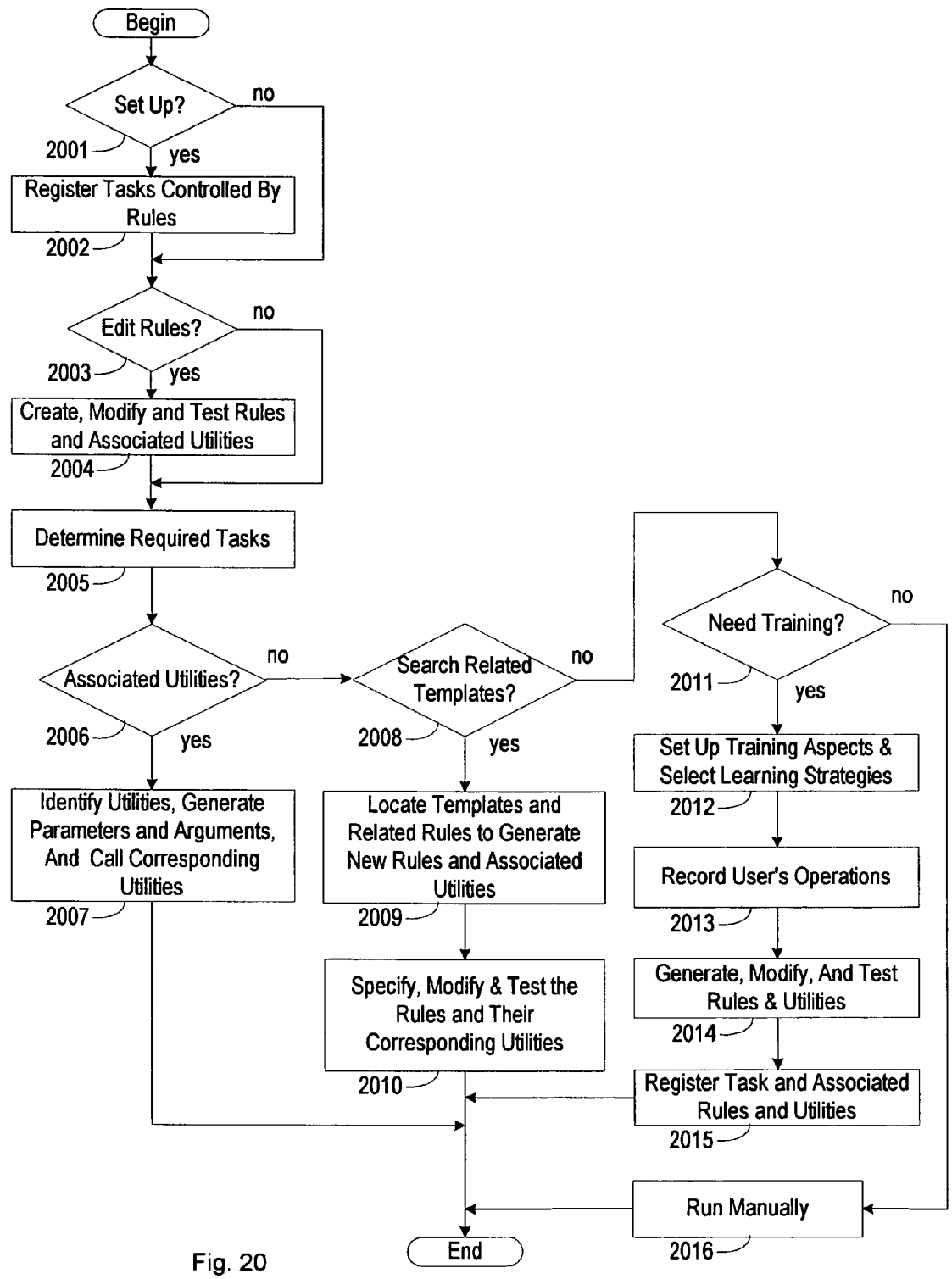
FIG. 20 illustrates an exemplary flowchart of the rule management module 323 in FIG. 3.

FIG. 20 shows the general flowchart for editing and executing the rules and associated utilities. The system registers tasks and lets these tasks controlled by related rules. Then, the system provides interfaces and utilities to edit, modify and test rules and associated utilities. Further, the system builds new rules and associated utilities according to some templates and guidance. In addition, the system provides interfaces for user to teach the system which aspects that the system will learn and to create rules and utilities by imitating the examples set by user. This module not only provides interfaces for a user to edit and debug the rules and corresponding utilities for controlling tasks, but also provides interfaces for a user to edit and debug the rules and corresponding utilities for controlling other rules and associating utilities.

At step 2001, the system checks if a user wants to set up or the system needs to set up. If yes, go to step 2002 and otherwise, go to step 2003.

At step 2002, the system provides interfaces for a user to register the tasks that a user or related rules will control. The corresponding rules will control and complete the registered tasks. The register process can be automatic. For example, according to the setting, the system can register all the tasks under a particular category with a corresponding rule.

At step 2003, the system checks if a user wants to edit the rules. Through proper settings, a user can debug whenever any error happens. If yes, go to step 2004 and otherwise, go to step 2005.

At step 2004, the system provides interfaces and utilities for a user to create, edit, and test rules and their associate utilities.

At step 2005, the system identifies the tasks that the system needs to do. A task can be a simple gesture that a virtual human object generates, or be a more complex one consisting of a series of simpler tasks.

At step 2006, the system checks if the task has associated rules. If yes, go to step 2007 and otherwise, go to step 2008.

At step 2007, the system identifies the utilities associated with the rules. While rules may have better friendly human interfaces in form of formal language, description, or equation, the utilities are the actual implementation of corresponding rules, which can be in many different forms such as regular expression and high-level computer language.

If the system has not found related utilities, then the system will generate one from a corresponding template, create one by following user's instruction and example, or provide interfaces for a user to perform the task.

At step 2008, the system checks if there are related templates saved in the database. How closely a task relates to a template depends on the definition of correlation and related rules for identifying the correlation. If yes, go to step 2009 and otherwise, go to step 2011.

At step 2009, the system locates templates to generate new rules and associated utilities by following rules specifically for creating new rules and utilities. The templates can also embed some rules for generating new rules and utilities.

At step 2010, the system provides interfaces for a user to specify, modify, and test the rules and their corresponding utilities.

If a particular task does not associate with any rule and utility and the task does not relate to any template, then at step 2011, the system checks if a user wants to train the module. If the user wants to train the module, go to step 2012 and otherwise, go to step 2016.

At step 2012, the system provides interfaces for a user to set up training aspects and to select learning strategies. The system can do this automatically according to setting, preference, and related rules for controlling the training aspects and learning strategies. There can be some predefined utilities associating with each existing strategy. A user can build new utilities for training.

At step 2013, the system records what a user has done while providing interfaces for the user to accomplish the job.

At step 2014, the system creates the rules according to user's example, setting, preference, the rules for generating new rules, and their associated utilities. Then, the system provides interfaces and utilities for a user to modify and test the new rules and the corresponding utilities.

At step 2015, the system provides interfaces for a user to register the task and associated rules and utilities. Later on, when system encounters a similar problem, the system will be able to call related rules and utilities.

A user may wants just run for once. At step 2016, the system provides interfaces for the user to complete the task without adding or modify any rules and associated utilities.

Figure 21:
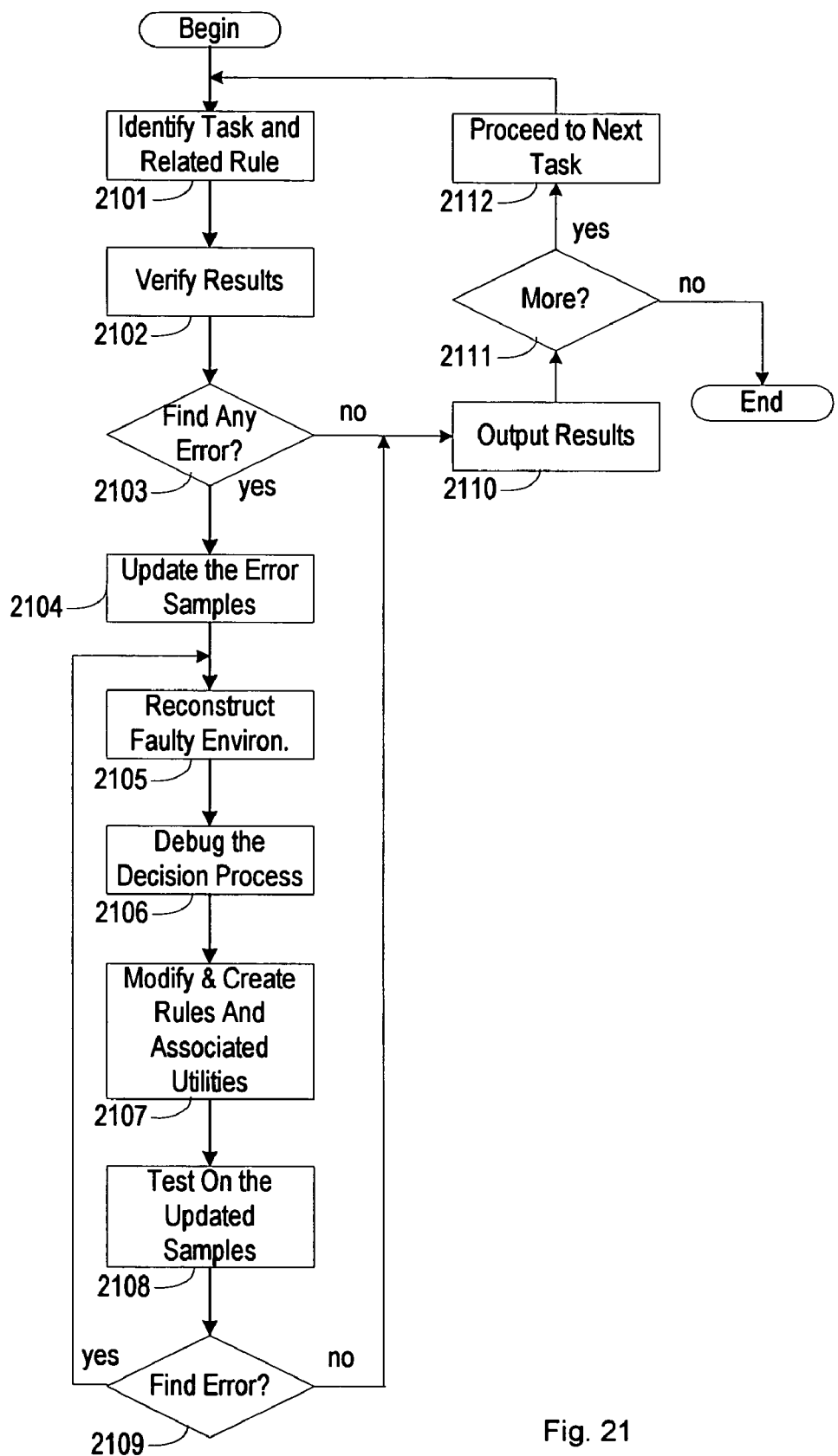
FIG. 21 illustrates the general flowchart of verifying and debugging rules involved at step 2004 in FIG. 20.

FIG. 21 shows the general flowchart to modify and test rules and associated utilities.

At step 2101, the system identifies the task and associated rules and utilities. The system registers the task with associating rules and utilities.

At step 2102, the system shows preconditions, displays the results from executing related utilities, and lets a user verify the result.

At step 2103, the system checks if a user has found any error. If yes, go to step 2104 and otherwise, go to step 2110.

At step 2104, the system collects the error example. The system uses this example, as well as other examples in a database, to test the modified rules and associating utilities.

At step 2105, the system reconstructs the environment where an error occurred.

At step 2106, the system lets a user debug problem by providing interfaces and debugging utilities. These interfaces and utilities can be ones embedded within the system or launched from a third party application with necessary parameters and commands passed.

During debugging process, at step 2107, a user can modify and create rules and associating utilities.

At step 2108, the system applies the modified rules and associated utilities to other samples. In practical situation, it happens frequently that people fix a problem and create a new one. Therefore, the system applies the new set of rules to the updated error samples. The system compares the results to the correct one in the database and displays the results different from the ones in database so that a user can verify.

At step 2109, the system checks if there is any error. If yes, go to step 2105 and repeat steps 2105 to 2109 until no any error. Otherwise, go to step 2110.

At step 2110, the system produces necessary output.

At step 2111, the system checks if there is another task. If yes, go to step 2112 and otherwise, finish.

At step 2112, the system moves to the next task. Then go to step 2201 and repeat the whole process again until no more tasks need to verify and debug.

Figures 22, 23:
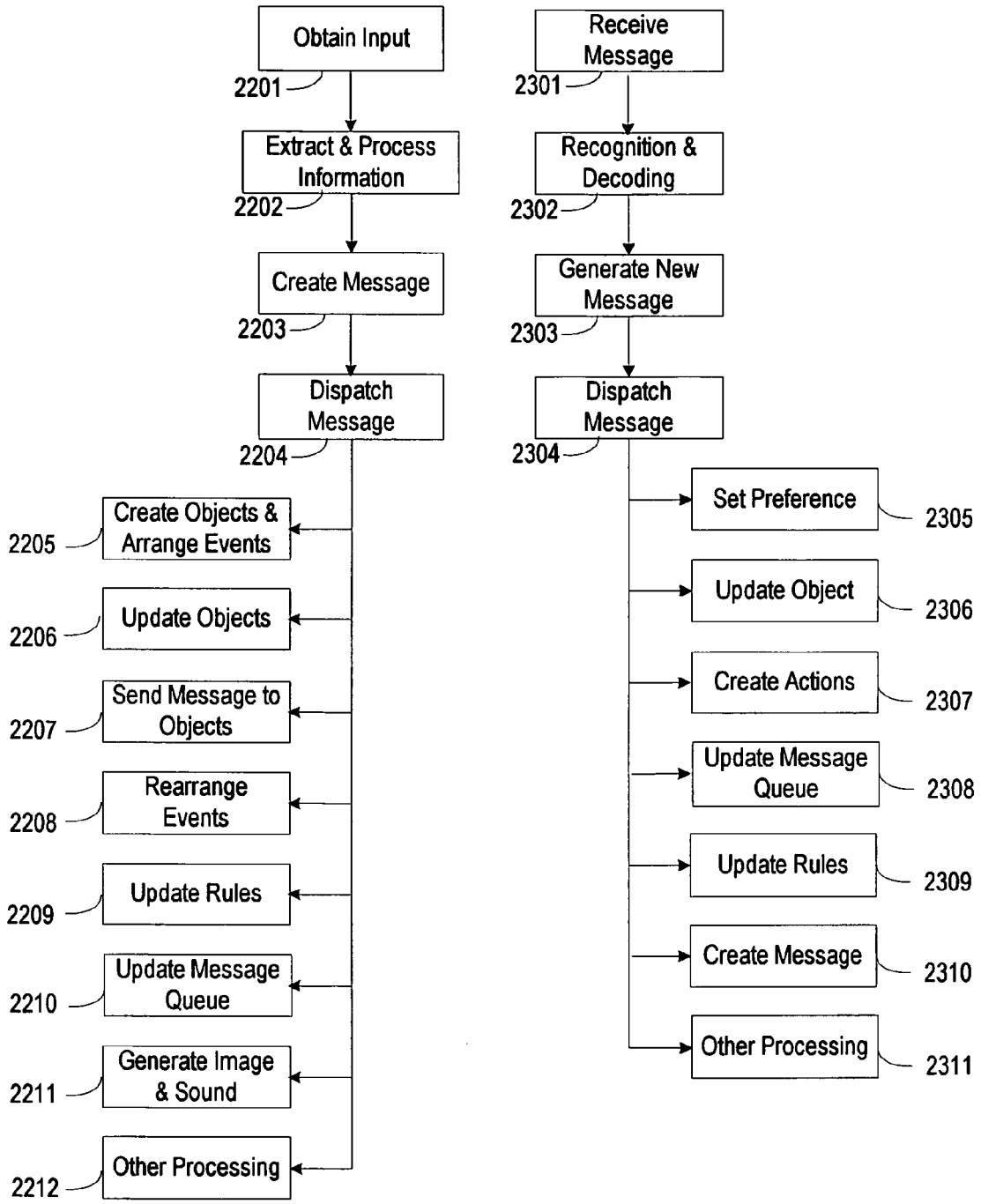
FIG. 22 illustrates an exemplary configuration of software implementation at system level.
FIG. 23 illustrates an exemplary configuration of software implementation at object level.

FIG. 22 shows the general structure of a preferred way of implementation. This information processing structure is similar to the structure of window-based processing. The system captures all the inputs, extracts information, forms various messages, dispatches messages to related objects, and processes the message needed to handle at system level. After the system has registered a task and the rules for completing a task, the system will replace a command for running the task by a command for running the task through a corresponding rule or its associating utility.

At step 2201, the system captures all the inputs, which can include the captured image and voice, keyboard input, mouse movement and clicks, the information from sensor and instrument, the message generated by internal utilities, and the message generated by various objects. Here message can be in various forms to transmit required information, parameters, and arguments. The system can provide interfaces for user to define new messages.

At step 2202, the system extracts information from the received input and processes the extracted information. The received input can be information without preprocessed, information with preprocessed but not in a format recognized by related utilities, in form of message recognized by the utilities but needing more information, or complete message being usable by the utilities. First, the system identifies the properties of received information such as what kind of information it is and figures out which parts miss and how to form proper message according to related setting and rules. Then, the system extracts information in a specified way and searches for extra information needed.

At step 2203, the system creates the messages according to the processed information and previous statuses of related objects and events, defined message forms, settings, and related rules for controlling message generation. Message is information in a form suitable to pass information to objects and utilities. For example, if the information is for a particular task, then the system will generate message according to the predefined format for that task.

At step 2204, the system dispatches the messages to related objects, related events, and utilities. The system can have a message queue and system can place a new message at the end of the queue by default or place the new message at a specific location identified by a related utility. Each object will check the message queue to find if there is any message for itself. The system can use various techniques to make some messages be urgent and need to execute immediately. For simplicity, one can call the related objects, related events, and related utilities as execution units. The message contains information to execute utilities at system level directly and to execute utilities at object level and at event level indirectly by passing the message to related object and related event first.

Some tasks are at system levels. These tasks can include creating objects and arranging events, sending message to particular objects, rearranging events, updating rules, and updating message queue. Depending on setting, implementation, and the nature of an operation, some tasks which can be at either system level or at objects level. These tasks can include updating objects and generating sound and image.

At step 2205, the system creates objects and arranges events. The system creates objects according to the description of the objects in a related example, the categories of particular objects, the default properties of these objects, templates saved in database, as well as saved objects. By default, the more specific one will override more general one and the one with higher priority will override the one with low priority in case of conflict. The system further arranges the events. There can be rules for guiding how to make arrangement on events. Usually, the system can arrange according to the chronological order of events and then on the spatial order of event. The more detail a description provides about an event, the more detail one can arrange the event. There can be some event templates each for a corresponding scenario. Depending on setting, the system can specify major events clearly specified by original examples with all other minor events generated on spot by individual object according to setting, variation range, general restriction, and random seeds. Further, the minor events can be one in a group of possible responses. The system can arrange the events with all events of both major and minor included. The system can further checks if all the objects and their action will be able to co-ordinate with each other. The system will make proper adjustment if there is a need. This process can repeat several times for handling the relations among different objects. For example, if one person hits another person on the nose, the default results can be one of the scenarios that the second person has blood on nose, covers nose, and cries. However, in the later part of an example, if the example says that the second person climbs up from ground, then the system will regenerate a corresponding event instead of a default one. The system can reduce this kind of regeneration when the rules for identifying the possible outputs from a hitting like that become more and more complete.

At step 2206, the system updates objects either at system level or at object level, depending on setting. When implemented on system level, the system collects related information about the updated states of each object, identifies possible relations among them, and then updates the objects. During interaction, the objects, especially human objects, can change their status especially mental status. For example, if a person originally is in a normal mental status, when his boss comes in and tells this person that the company decides to promote the person to a senior position, then the person's mental status may change into a one with happier ingredient for some period. Other human basic personality and general behavior determines how much a mental status will change.

At step 2207, the system identifies and sends the message for an object to that object. The system can send the message to the message queue of the object directly. In addition, system can places the message in the system message queue and lets each object obtain its own message by itself. Alternatively, the system can use the combination of both ways. Though the system implements message dispatching in such a way that the system can do all processing on system level, it will be more flexible for each object, especially a complex object such as a virtual human object to handle the message to it by itself. The system can send a same message to several objects of the same kind with each object generating different responses because of different status of each object.

At step 2208, the system rearranges events. The system predicts the possible responses and generates a set of possible following events, makes the proper events happen if the prediction is right, and then arranges events for next stage or next time slot. The larger of the possible candidate event set is, the more possible that the actual events will fall into one of the possible predictions will be. However, it is difficult to list all the possible responses and also it will take a lot of computer memory and computer time to generate all the possible events, therefore, there will be a tradeoff. For a particular stimulus, there can be a reasonable size of possible events under certain conditions. If a user or other person produces an action that is out of the prediction, then the system will recalculate the possible responses from virtual people according to the captured inputs, related rules, and background information, and replace the previous arranged events with the newly generated events.

At step 2209, the system updates the rules. The system performs various tasks according to the setting and rules. The system can provide interfaces for a user to register tasks and to create and edit rules for the tasks and other rules. The system can also learn from user's operations. In addition, the system provides user to sort rules into various categories. There can be rules associated with various aspects of an operation.

At step 2210, the system updates the message queue. Depending on what actually happens, the system will add some messages, delete some messages, and replace some invalid old messages with valid newly generated messages.

At step 2211, the system generates image and sound. Depending on the actual implementation, the objects may generate the corresponding image and sound as in full view movie. For 2D and 3D image, it is more proper to generate image at system level to save computer time and memory. According to the position relationship among observer and objects, the system projects image according to well-know projecting principle used in drawing. The system does not have to create virtual image of objects. Instead, the system can generate 2D or 3D image according to the positions and shapes of objects. The system can also create stereo sound according to the position relationship. The system may model a real person so that later a user can check various aspects that the user feels interested.

At step 2212, the system handles all other tasks. Some exemplary tasks are error-handling utility and help utility.

FIG. 23 shows the basic tasks performed by a virtual article such as a virtual object, especially a human object. There are three major parts. First, the object receives a message from the system message queue or from its own queue. Then, the system recognizes the message. Finally, the system makes proper action on the received message by calling a corresponding utility.

At step 2301, the virtual article obtains its message either from the system message queue or from its own message queue. Depending on implementation, the article examines a system message queue to fetch message for the article or receive a message destining for the article at its own message queue.

At step 2302, the article recognizes the message and decodes the message. Different messages tell a virtual article to do different things.

At step 2303, the virtual article generates a new message. This new message is in proper format recognized by its utilities. According to the received message, the virtual object can simply pass the received message as a new message, wait for more messages to form a new message, split a message into several new messages, and ask for specific information from system. Since the received message is one generated by the system, it may be improper to call a utility associated with an article directly. Therefore, the article transforms the received message into a proper format understood by its utilities. Further, the article can add and modify parameters and variables and change their orders.

At step 2304, the virtual article dispatches message by sending newly generated messages to related message queues and utilities. There can be many different utilities for performing different tasks. According to the message, the virtual objects calls related utilities with proper parameters and arguments passed.

There are many different actions related to each virtual object. Some of them are to set preference, to update object, to update message queue, to update rules, and to create new message.

At step 2305, the setting preference utility sets up preference. The system passes proper message to let the virtual article to set its settings.

At step 2306, the updating utility updates the properties of an article as well as associated utilities. During a section, the properties of the article may need to change. For example, the system may replace the original handling utilities for a particular action by other handling utilities.

At step 2307, the action utility creates various actions for an object.

The virtual article may need more information to perform a particular task or the virtual article may generate a new message for a particular action. The system can send this message either to the article itself to call different utilities, to system to call the utilities at system level, or to other virtual objects. At step 2308, the updating message queue utility updates its own message queue or send message to the system level queue.

At step 2309, the updating rule utility updates the rules related to the article. The rules can relate to the type of article or the particular instance of the article. The system can provide interfaces and utilities for the system to learn about a particular operation or template and to form corresponding rules. The system can also provide interfaces for user to specify rules.

At step 2310, the new message utility creates a new message for system and for its own queue. The new message can inform the system of various changes, especially the change made by the virtual article itself, ask the system for more information, and register a particular message. An object may create some messages for itself. The system will place a message for system at the system level queue, place the message for the module itself in the system level queue or in its own message queue, or place the message in its own message queue when the message queue is available.

At step 2311, the other utilities perform various other operations. Some examples include displaying the internal properties and the mental status migration of the virtual people.

What is claimed is:

1. A consultative system containing an advice and having a projection device, for helping a user to improve one's interactive ability by analyzing a particular person's behaviors in a simulation environment, said particular person being selected from a group including said user, a person different from said user, and a virtual person, said system comprising:
building a plurality of virtual events for said advice, said plurality of virtual events involving interactions among two or more persons;
projecting said plurality of virtual events by said projection device;
capturing a response from said particular person;
analyzing said response according to said advice to produce a report; and
providing said report to said user,
whereby said system guides said user to observe and examine said particular person's behaviors in a simulation scenario so that said user can learn effectively from both one's own behaviors and other person's behaviors and is able to apply said advice more naturally in a real life.

2. The system in claim 1, said plurality of virtual events involving a plurality of activities produced by a plurality of virtual human objects, said advice associating an example in a form selected from a group including text descriptions, image descriptions, and a recorded plurality of virtual events, said system further comprising means for controlling projecting speed and means for controlling projecting direction; in case said example is in form of text descriptions, wherein said building a plurality of virtual events for said advice comprises means for helping said user visualize said example, means for building a virtual human object, means for instantiating a virtual human object, means for devising a virtual event schedule according to said text descriptions, and means for constructing said plurality of virtual events; in case said example is in form of image descriptions, wherein said building a plurality of virtual events for said advice comprises means for modifying image descriptions, means for emphasizing important issues, means for removing trivial portions, means for inserting assistant actions, means for building a virtual human object, and means for instantiating a virtual human object; in case said example is in form of a recorded plurality of virtual events, wherein said building a plurality of virtual events for said advice comprises means for modifying a particular virtual human object, means for modifying a particular virtual event, and means for providing comments for a particular virtual event.

3. The system in claim 1, said system further comprising means for processing advices, wherein said means for processing advices comprise means selected from a group including means for collecting, comparing, modifying, formatting, organizing, saving, searching, and displaying advices, means for building links among various advices, means for splitting an advice into two advices, means for merging two advices into one advice, means for adding an example to a particular advice, means for making comment on a particular comment, means for identifying assumptions associating with a particular advice, means for specifying an application scope for a particular advice, means for attaching restriction on a particular advice, means for dispatching an advice as text, image, symbol or sound, and means for providing discrimination among similar advices.

4. The system in claim 1, said advice associating an example, said system having a plurality of human being models, a plurality of psychological models, and a plurality of partitions for separating people into a plurality of different categories according to a plurality of different standards respectively, wherein building a plurality of virtual events for said advice comprises means for building said plurality of virtual events according to a particular model for said particular person, means for updating said plurality of virtual events according to said response from said particular person, and means for creating a plurality of variations on said plurality of virtual events.

5. The system in claim 1, said system having a plurality of human being models, a plurality of psychological models, and a plurality of partitions for separating people into a plurality of different categories according to a plurality of different standards respectively, said response is a plurality of actions by said particular person, wherein each said action is selected from a group including voice features, words used, sentence patterns, heart beat rates, facial expressions, gestures, and other body languages, wherein said particular person is selected from a group including said user and a person different from said user, wherein said analyzing said response further comprise means selected from a group including means for analyzing said response by making use of a corresponding psychological model for said particular person, means for analyzing said response by making use of a coordinate of said particular person in a particular partition, means for making a joint decision according to said plurality of actions, means for performing pre-analysis, means for performing post-analysis, and means for simulating a thought developing process of a particular person by a mathematic method according to a psychological model for said particular person, current states of said particular person, historic situation of said particular person, and stimulus provided to said particular person, wherein said means for performing pre-analysis include means for analyzing important issues and means for reminding said user for paying attention to a particular issue, wherein said means for performing post-analysis include means for reviewing a consulting session and means for examining facial expressions, body languages, words used, and emotions.

6. The system in claim 1, wherein said projecting said plurality of virtual events further comprises means for generating a sequence of 2D or 3D images, means for producing sounds corresponding to said 2D or 3D images, and means for producing said plurality of virtual events in one mode selected from a group including normal speed, low speed, fast forward, and fast backward, said system further comprising first means for synthesizing sound and second means for synthesizing image;

wherein said first means for synthesizing sound comprises means for specifying voice features, means for specifying pronunciation features, means for analyzing sentence patterns, means for adjusting voice according to sentence patterns, means for identifying emphasis, means for adjusting voice according to emphasis, means for identifying un-regularity, means for adjusting voice according to un-regularity, and means for edit voice directly on related text; and wherein said second means for synthesizing image comprises means for loading background information, means for instantiating objects, means for identifying actions, means for interpolating actions, means for animating objects, means for selecting a viewing direction; and means for editing action directly on an action description file.

7. The system in claim 1, connecting to a proper recording device to capture said response from a particular person, said system further comprising means for reviewing a consulting session involved said particular person, said means comprising:
means for recording said consulting session to generate image record signals and sound record signals through said proper recording device;
means for identifying a plurality of behaviors generated by said particular person from said image record signals and said sound record signals;
means for recreating a plurality of rebuilt virtual events by making use of said plurality of behaviors and said plurality of virtual events;
means for specifying a viewing position for said user;
means for projecting said plurality of rebuilt virtual events according to said viewing position;
means for tracking said plurality of rebuilt virtual events;
means for analyzing status of said particular person;
and means for evaluating progress of said particular person,
whereby said means for tracking said plurality of rebuilt virtual events let said user conduct a plurality of activities selected from a group including searching a particular advice, searching a particular event, searching a particular object, searching a particular word, searching a particular sentence pattern, zooming in, zooming out, recording, playing, making fast forward, making fast backward, slowing down, speeding up, pausing, and stopping;
wherein said means for analyzing status of said particular person lets said user examine inner mind migration process according to a corresponding psychological model of said particular person, inputs to said particular person, and previous status of said particular person; and
whereby said means for evaluating progress of said particular person let said user notice progress by capturing feedback from said particular person, analyzing said feedback to create an evaluation result, and comparing said result with previous results saved in said system.

8. The system in claim 1, said system having a recording device to record a plurality of real events, said system further comprising means for providing a plurality of variations on said plurality of real events to produce said plurality of virtual events, means for replaying said plurality of virtual events from a different direction, means for repeating a consulting session, means for tracking said plurality of virtual events, means for dispatching a corresponding advice in a plurality of formats, means for making comments, means for providing suggestions, means for providing an affirmation, wherein said report comprises items selected from a group including comments, suggestions, critical issues, responding modes, responding delays, if responding is proper, if facial expression is proper, if word used is proper, if speaking tune is proper, if gesture is proper, if said particular person focuses on a right thing, how emotion sensitive words is used, if there is any misused word, and if there is any misconduct, wherein means for providing a plurality of variations on said plurality of real events further comprise means selected from a group including means for building a different virtual environment, means for specifying a virtual person with different personality, means for changing a word by one of its synonyms, and means for changing a sentence pattern with a different one, whereby said system provides a simulation environment for said user to keep practicing so that said user can gradually enhance controllable ability on one's behavior, increase emotional sensibility, accelerate response speed, and increase observational sharpness.

9. The system in claim 1, said particular person is said user, said system further comprising means for building a desired virtual environment, means for building a plurality of virtual human objects with desired characters, means for providing a plurality of variations, means for modeling said user according to said response, means for inserting said user into said plurality of virtual events, means for watching said plurality of virtual events from different directions, and means for providing a positive affirmation, whereby said system can help said user to gain a particular experience by participating a plurality of variations of a consulting session with said user as an participant and by watching a plurality of variations of a consulting session with said user being modeled as a virtual human object.

10. The system in claim 1, said system further comprising means for helping a person to replace a negative experience formed in a plurality of real events by a positive virtual experience, wherein said means comprise means for building a desired environment from said negative experience, means for building a plurality of desired human objects from said negative experience, means for building said plurality of virtual events from said plurality of real events with desired properties, means for modeling said particular person with desired characteristic, means for providing a plurality of variations for said plurality of virtual events, and means for providing a plurality of desired affirmations, whereby said system helps said particular person erase a negative experience by letting said particular person participating a plurality of variations of a consulting session and by watching a plurality of variations of a consulting session with said particular person being modeled as a virtual human object.

11. The system in claim 1, said system having a plurality of human object templates, said system further comprising means for modeling a person, means for helping said user to observe a person from a plurality of different points of viewing, and means for understanding a particular reaction of a person by simulating a mind migration process of said person, wherein said means for modeling a person further comprise means selected from a group including means for helping said user to depict a person according to said plurality of human object templates, means for helping user to extract a plurality of features from a person, means for modeling a person according to said plurality of features, and means for modeling a psychological developing process of a person.

12. The system in claim 1, said system further containing a plurality of virtual object templates and comprising means selected from a group including means for constructing a virtual environment to simulate a real situation, means for adjusting a virtual event schedule for said plurality of virtual events, means for editing a virtual event, means for inserting an assistant virtual event into said virtual event schedule, and means for interpolating actions, wherein said means for constructing a virtual environment comprises means selected from a group including means for creating a new virtual environment from an existing virtual environment, means for creating a new virtual environment from scratch, means for loading an existing virtual environment into said system, means for creating a virtual object from a corresponding virtual object template and placing said virtual object in said virtual environment, means for selecting a virtual object, specifying properties of said virtual object, and initializing position of said virtual object in said environment, means for adding a virtual human object and specifying behaviors of said virtual human object, and means for defining and modifying relations among various virtual objects.

13. The system in claim 1, said particular person is said user, said system containing a plurality of virtual experts with each expert consulting a particular aspect, said system further comprising means for enhancing observation, wherein said means for enhancing observation comprise means selected from a group including means for registering a specific observation that said user wants to improve, means for comparing said response with ones saved in said system, means for dispatching said advice in various formats to said user, means for asking opinions from a particular virtual expert, means for slowing a consulting session down, means for viewing said plurality of virtual events from a different position, means for indicating what said user has notified and what user has failed to notify, and means for analyzing relations among various virtual objects, whereby said system helps said user to increase observational sharpness.

14. The system in claim 1, said system containing a plurality of virtual human objects for modeling a plurality of persons, said particular person is said user, said system further comprising means for helping said user to learn self control, wherein said means for helping said user to learn self control comprises means for controlling a consulting process, means for viewing said consulting process from a different person's eyes, means for monitoring body languages, facial expressions, words used, speaking mode, speaking speed, and heart beating, means for reminding said user on various issues, means for providing advices in various formats, and means for deriving for possible outcomes.

15. The system in claim 1, said system further comprising means for building a virtual regular object, means for modeling a virtual human object; and means for updating a virtual human object; wherein said means for building a virtual regular object further comprise means selected from a group including means for building a virtual regular object from a corresponding virtual regular object template, means for building a virtual regular object from another virtual regular object, means for assigning a plurality of properties to said virtual regular object, means for assigning default properties for said virtual regular object, means for linking said virtual regular object to a corresponding utility, means for projecting said virtual regular object as a 2D image, means for projecting said virtual regular object as a 3D image; wherein said means for modeling a virtual human object further comprise means for listing characters of said human object, means for quantifying said characters, means for selecting a partition, means for finding a co-ordinate of said human object in said partition, and means for defining a particular behavior for said virtual human object.

16. The system in claim 1, said system further comprising means for providing personal emotional training, said means for providing personal emotional training further comprising means for creating a plurality of variations on said plurality of virtual events, means for modifying scenarios, and means for making variations on spoken sentences, facial expressions, and body languages, means for projecting a plurality of modified virtual events, means for simulating thought developing progress of a human object, and means for recognizing real meaning, said means for recognizing real meaning comprising means for making a joint decision, first means for capturing words and words patterns from an human object, second means for capturing actions from said human object, and third means for capturing sensor information from said human object; wherein said first means comprise means for extracting voice feature, means for identifying un-regularity, means for converting voice to text, and means for registering what texts to be captured; wherein said second means comprise means for extracting facial expression, means for extracting gesture, means for extracting body languages, and means for registering an action; wherein said third means comprise means for extracting information from a sensor, means for analyzing said information from said sensor, and means for registering attribute.

17. A consultative system for helping a user to improve one's inter-personal skills according to an advice, said system containing a plurality of human being models, a plurality of examples corresponding to said advice with each said example involving interactions among two or more persons, and a plurality of rules with each rule for performing a corresponding task, said system comprising:
- devising a virtual event schedule according to said corresponding examples and said advice;
- constructing a plurality of virtual events according to said corresponding examples and said advice, said each virtual event being composing of a plurality of movements selected from a group including verbal expressions, body languages, graphic presentations, and animations;
- projecting said plurality of virtual events by a projection device according to said virtual event schedule;
- capturing a response from said user by a recording devise;
- analyzing said response according to said advice and said plurality of human being models to produce a feedback;
- providing said feedback to said user; and
- providing flexibility by making use of said plurality of rules,
- whereby said system helps said user to increase one's inter-personal skills with defining said plurality of rules to handle various complex tasks.

18. The system in claim 17, wherein said providing flexibility further comprise means for registering a plurality of tasks to be done by a plurality of corresponding rules respectively, means for creating, modifying, and testing rules, means for determining required tasks, means for executing a utility associated with a corresponding task, means for building a rule from a template, means for learning from user's manual operation, and means for performing operation manually;
- wherein said means for creating, modifying, and testing rules comprise means for verifying and debugging rules, means for identifying task and associated rules and utilities, means for verifying results, means for updating testing samples, means for reconstructing faulty environment, means for debugging a decision process, means for creating and modifying rules and associated utilities, and means for testing on updated testing samples, said means for verifying and debugging rules further comprising means selected from a group including for displaying and selecting rules and associated utilities, means for adding testing examples associated with said rules and utilities, means for adjusting priorities and conditions for said rules, means for combining rules, means for splitting rules, means for generalizing rules, means for specializing rules, means for editing, debug, and testing script, means for editing, debug, and testing subroutine, and means for editing, debug, and testing regular expression; and
- wherein said means for learning from user's manual operation comprise means for setting up training aspects, means for selecting learning strategies, means for record user's operations, means for generating, modifying, and testing rules and utilities, and means for register task and its associated rules and utilities, and means for performing operation manually.

19. A consultative system for helping a user to improve one's ability according to an advice, said system containing a plurality of human being models, a plurality of examples corresponding to said advice with each said example containing a plurality of objects and a plurality of events conducted by said plurality of objects and involving interactions among two or more persons, and a plurality of rules with each rule for performing a corresponding task, said system comprising:
- means for constructing a plurality of virtual objects according to a particular example;
- means for constructing a plurality of virtual events generated by said plurality of virtual objects according to said plurality of events in said particular example, said each virtual event composing of a plurality of movements selected from a group including verbal expressions, body languages, graphic presentations, and animations;
- means for projecting said plurality of virtual events by a projection device according to said virtual event schedule;
- means for capturing a response from said user by a recording devise;
- means for analyzing said response according to said advice and said plurality of human being models to produce an instruction;
- means for providing said instruction to said user; and
- means for providing interactive service,
- whereby said system helps said user to improve ability to handle relations between human-beings through an interactive way.

20. The system in claim 19, said means for providing interactive service further comprising:
- means for obtaining inputs, said inputs including information about said plurality of virtual objects, information about said plurality of virtual events, and said response from said user;
- means for extracting information from said inputs according to setup, preference, and rules on collecting information to produce extracted information;
- means for preprocessing said extracted information according to rules on preprocessing said extracted information to produce preprocessed information;
- means for creating a message in a predefined format from said preprocessed information according to rules on forming message, said message containing information on an operation to be executed, parameters associated with said operation, and variables linked with said operation;
- means for dispatching said message by placing said message in a message queue in a particular position, said message queue holding a plurality of messages; and
- means for executing said message by fetching said message from said message queue, deciding a proper execution unit for executing said message, and transferring said message to said proper execution unit, said proper execution unit being selected from a pluralities of execution units with each execution unit having a different processing purpose;
- means for a virtual article to handle said message, said virtual article being one selected from a group consisting of virtual objects and virtual events, said virtual article associating a plurality of utilities for performing various tasks;
- wherein said pluralities of executions units is able to create objects, to arrange said events, to update objects, to send a message related to a particular object to said particular object, to rearrange said events, to update said plurality of rules, to update message queue, to execute a utility, to execute a rule, and to create image and sound; identifying said message by finding out operation involved, parameters associated, and variables passed and decoding said message into information understood by said virtual article to generate decoded information, means for creating an article specific message according to decoded information, said new message being in a format understood by said plurality of utilities, means for dispatching said article specific message to a proper utility; and means for executing said article specific message by calling said proper utility;

whereby said system will have said message executed by passing said message to a corresponding execution unit;

whereby said plurality of utilities comprises means for setting preference, means for updating object, means for creating actions, means for updating message queue, means for updating rules, means for creating message;

whereby said article can generate a article specific message for said article for next operation by calling said means for creating message; and whereby said method can generate a system level message from calling said means for creating message by said article and provide consulting service interactively.

* * * * *